(12) United States Patent
Miura et al.

(10) Patent No.: US 11,014,430 B2
(45) Date of Patent: May 25, 2021

(54) REFRIGERATION CYCLE DEVICE

(71) Applicant: DENSO CORPORATION, Kariya (JP)

(72) Inventors: Koji Miura, Kariya (JP); Yoshiki Kato, Kariya (JP); Masayuki Takeuchi, Kariya (JP); Nobuyuki Hashimura, Kariya (JP); Keigo Sato, Kariya (JP); Norihiko Enomoto, Kariya (JP); Kengo Sugimura, Kariya (JP); Ariel Marasigan, Kariya (JP)

(73) Assignee: DENSO CORPORATION, Kariya (JP)

( * ) Notice: Subject to any disclaimer, the term of this patent is extended or adjusted under 35 U.S.C. 154(b) by 166 days.

(21) Appl. No.: 16/285,269

(22) Filed: Feb. 26, 2019

(65) Prior Publication Data

US 2019/0184790 A1 Jun. 20, 2019

Related U.S. Application Data

(63) Continuation of application No. PCT/JP2017/027371, filed on Jul. 28, 2017.

(30) Foreign Application Priority Data

Aug. 30, 2016 (JP) .............................. JP2016-167743
May 25, 2017 (JP) .............................. JP2017-103377

(51) Int. Cl.
*B60H 1/00* (2006.01)
*B60H 1/32* (2006.01)

(52) U.S. Cl.
CPC ..... *B60H 1/00878* (2013.01); *B60H 1/00278* (2013.01); *B60H 1/00899* (2013.01);
(Continued)

(58) Field of Classification Search
CPC ...... B60H 1/00878; B60H 2001/00928; B60H 2001/3263; B60H 2001/3285; F25B 40/06;
(Continued)

(56) References Cited

U.S. PATENT DOCUMENTS

2009/0249802 A1 10/2009 Nemesh et al.
2012/0042674 A1* 2/2012 Takenaka ................. F24F 11/30
62/180
(Continued)

FOREIGN PATENT DOCUMENTS

CN 101551174 A 10/2009
CN 101694330 A 4/2010
(Continued)

*Primary Examiner* — Marc E Norman
(74) *Attorney, Agent, or Firm* — Harness, Dickey & Pierce, P.L.C.

(57) ABSTRACT

A refrigeration cycle device has a compressor, a radiator, a decompressor, an evaporator, a heat medium cooling evaporator, a cooling target device, a detector, and a controller. The heat medium cooling evaporator cools a cooling heat medium by performing a heat exchange between the refrigerant decompressed in the decompressor and the cooling heat medium. The cooling heat medium cools the cooling target device. The detector detects a subcooling state of the cooling target device having a temperature lower than or equal to a reference temperature. Upon the detection of the subcooling state in the cooling target device by the detector, the controller increases the degree of superheat of the refrigerant flowing out of the heat medium cooling heat exchanger as compared to the degree of superheat of the refrigerant flowing out of the heat medium cooling heat exchanger when the detector does not detect the subcooling state.

15 Claims, 9 Drawing Sheets

(52) U.S. Cl.
CPC ....... *B60H 1/3211* (2013.01); *B60H 1/32284* (2019.05); *B60H 1/004* (2013.01); *B60H 1/3207* (2013.01); *B60H 2001/00928* (2013.01); *B60H 2001/3263* (2013.01); *B60H 2001/3285* (2013.01)

(58) Field of Classification Search
CPC .......... F25B 2313/003; F25B 2341/064; F25B 2600/2513; F25B 2700/21175
USPC .................................................. 62/180, 225
See application file for complete search history.

(56) References Cited

U.S. PATENT DOCUMENTS

| | | |
|---|---|---|
| 2012/0241139 A1 | 9/2012 | Katoh et al. |
| 2012/0255319 A1 | 10/2012 | Itoh et al. |
| 2014/0223925 A1 | 8/2014 | Kawakami et al. |
| 2015/0159933 A1 | 6/2015 | Itoh et al. |

FOREIGN PATENT DOCUMENTS

| | | | |
|---|---|---|---|
| JP | 2012201215 A | 10/2012 | |
| JP | 2012225637 A | 11/2012 | |
| JP | 2013061099 A | 4/2013 | |
| JP | 2016132429 A | 7/2016 | |

\* cited by examiner

REFRIGERATION CYCLE DEVICE

CROSS REFERENCE TO RELATED APPLICATIONS

The present application is a continuation application of International Patent Application No. PCT/JP2017/027371 filed on Jul. 28, 2017, which designated the United States and claims the benefit of priority from Japanese Patent Application No. 2016-167743 filed on Aug. 30, 2016 and Japanese Patent Application No. 2017-103377 filed on May 25, 2017. The entire disclosures of the applications are incorporated herein by reference.

TECHNICAL FIELD

The present disclosure relates to a refrigeration cycle device including a heat exchanger that performs a heat exchange between a refrigerant and outside air.

BACKGROUND ART

Refrigeration cycle devices may include a compressor, a condenser, a decompressor, and an evaporator, and is included in an air conditioner for a vehicle.

As an example, a refrigeration cycle device may be configured to set various refrigerant circuits so that the refrigeration cycle device is operated in various modes such as a cooling mode, a heating mode, and a dehumidifying and heating mode.

SUMMARY

In one aspect of the present disclosure, a refrigeration cycle device has a compressor, a radiator, a decompressor, an evaporator, a heat medium cooling evaporator, a cooling target device, a detector, and a controller. The compressor compresses a refrigerant and discharges the refrigerant. The radiator allows the refrigerant discharged from the compressor to radiate heat. The decompressor decompresses the refrigerant flowing into the decompressor after radiating heat in the radiator. The evaporator evaporates the refrigerant by performing a heat exchange between the refrigerant decompressed in the decompressor and air. The heat medium cooling evaporator cools a cooling heat medium by performing a heat exchange between the refrigerant decompressed in the decompressor and the cooling heat medium. The cooling heat medium has a specific heat greater than a specific heat of air. The cooling target device is cooled by the cooling heat medium flowing into the cooling target device after exchanging heat with the refrigerant in the heat medium cooling evaporator. The detector is configured to detect a subcooling state of the cooling target device having a temperature lower than or equal to a reference temperature. Upon the detection of the subcooling state in the cooling target device by the detector, the controller increases the degree of superheat of the refrigerant flowing out of the heat medium cooling heat exchanger as compared to the degree of superheat of the refrigerant flowing out of the heat medium cooling heat exchanger when the detector does not detect the subcooling state.

BRIEF DESCRIPTION OF DRAWINGS

The above and other objects, features and advantages of the present disclosure will become more apparent from the following detailed description made with reference to the accompanying drawings.

DETAILED DESCRIPTION

Figure 1:
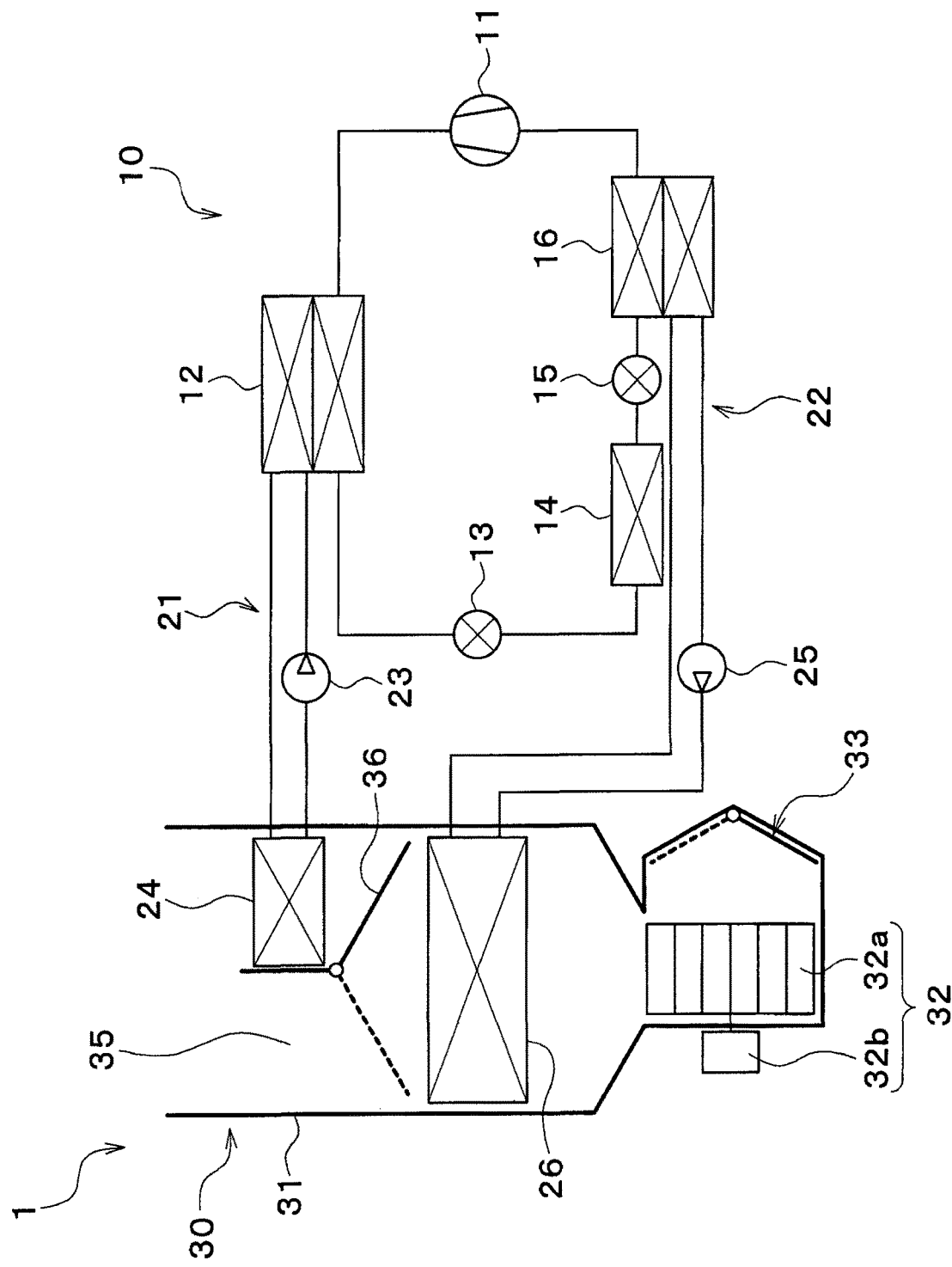
FIG. 1 is a configuration diagram of an entire refrigeration cycle device according to a first embodiment.

As an example, a refrigeration cycle device may include a compressor, an interior condenser, a first expansion valve, a second expansion valve, an exterior heat exchanger, and an interior evaporator. The refrigeration cycle device may be operated in various modes such as a dehumidifying and heating mode, a heating mode, and a cooling mode.

In the dehumidifying and heating mode, the refrigeration cycle device connects the interior evaporator and the exterior heat exchanger in parallel to set a refrigeration circuit in which each of the interior evaporator and the exterior heat exchanger evaporates the refrigerant. Specifically, the interior evaporator cools the air supplied into a cabin of the vehicle by performing a heat exchange between the air and the refrigerant. The exterior heat exchanger absorbs heat from outside air and reheats the air using the heat of the outside air.

When the refrigeration cycle device is operated in the dehumidifying and heating mode, it is necessary to cool the interior evaporator to dehumidify the air, e.g., flowing toward a cabin of a vehicle. That is, the interior evaporator is a cooling target device. However, when the interior evaporator is subcooled, water may be condensed on a surface of the interior evaporator. When the condensed water is frozen, the interior evaporator would be frosted. The frost formation would result in deterioration of a heat exchanging performance of the interior evaporator.

That is, the refrigeration cycle device is required to cool the interior evaporator while keeping a temperature of the interior evaporator higher than a saturation temperature at which the interior evaporator starts to be subcooled.

On the other hand, an evaporation temperature at which the refrigerant is evaporated in the interior heat exchanger is required to be lower than a temperature of outside air so that the interior condenser heats the air sufficiently. Especially, when the temperature of the outside air is low, e.g., in winter, the evaporation temperature is required to be lower than 0° C.

Then, it may be considered to dispose a constant pressure valve on a downstream side of the interior evaporator along a flow direction of the refrigerant so that the evaporator temperature is kept higher than or equal to 0° C.

However, when disposing the constant pressure valve, a quantity of components may increase or a structure of the refrigeration cycle device may be complicated. In addition, a pressure loss would occur in the constant pressure valve in the cooling mode. The pressure loss would result in deterioration of a cooling performance of the refrigeration cycle device.

In view of the above-described issues, embodiments of the present disclosure will be described hereafter with reference to the drawings. In the embodiments, a part that corresponds to or equivalents to a matter described in a preceding embodiment may be assigned with the same reference number.

First Embodiment

A first embodiment will be described in detail with reference to the drawings. In the first embodiment, a refrigeration cycle device is mounted to an air conditioner for a vehicle that adjusts a temperature in a cabin of the vehicle to be an appropriate temperature.

FIG. 1 depicts a refrigeration cycle device 10 according to the first embodiment, as a vehicle refrigeration cycle device included in an air conditioner 1 for a vehicle configured to regulate temperature of a cabin of the vehicle to an appropriate value.

The refrigeration cycle device 10 is included in a hybrid vehicle configured to acquire drive power for moving the vehicle from both an engine (i.e., an internal combustion engine) and a travel electric motor. The hybrid vehicle according to the first embodiment is configured as a plug-in hybrid vehicle.

The hybrid vehicle is configured to charge a battery 27 mounted on the vehicle with electric power supplied from an external power source (i.e., a commercial power source) when the vehicle stops. Examples of the battery 27 include a lithium ion battery.

The drive power output from the engine in the hybrid vehicle is used for moving the vehicle as well as operation of a power generator. The battery 27 stores electric power generated by the power generator as well as electric power supplied from the external power source.

The electric power stored in the battery 27 is supplied to the travel electric motor as well as to various on-board equipment including an electric sub-assembly configuring the refrigeration cycle device 10.

As depicted in FIG. 1, the air conditioner 1 for a vehicle includes the refrigeration cycle device 10 and an interior air conditioning unit 30.

The refrigeration cycle device 10 is configured as a vapor compression refrigerating machine. The refrigeration cycle device 10 includes a compressor 11, a high-pressure heat exchanger 12, a first expansion valve 13, an exterior heat exchanger 14, a second expansion valve 15, and a low-pressure heat exchanger 16.

A fluorocarbon refrigerant is used as a refrigerant circulating in the refrigeration cycle device 10. The refrigeration cycle device 10 configures a subcritical refrigeration circuit having high refrigerant pressure not exceeding critical pressure of the refrigerant.

The compressor 11 draws the refrigerant, compresses the refrigerant, and discharges the compressed refrigerant to the refrigeration cycle device 10. The compressor 11 is configured as a motor compressor driven with electric power supplied from the battery 27 or as a variable capacity compressor driven by means of a belt.

The high-pressure heat exchanger 12 exchanges heat between the refrigerant at a high pressure discharged from the compressor 11 and cooling water of a high-temperature cooling water circuit 21 to condense the refrigerant at the high pressure. The high-pressure heat exchanger 12 functions as a so-called condenser. The high-temperature cooling water circuit 21 will be described later in greater detail.

The first expansion valve 13 decompresses and expands a liquid-phase refrigerant flowing out of the high-pressure heat exchanger 12. The first expansion valve 13 configures the decompressor according to the present disclosure to function as the first decompressor.

The first expansion valve 13 includes a valve body and an electric actuator to have an electric variable throttle mechanism. The valve body is configured to change passage opening degree (i.e., a throttle opening degree) of a refrigerant passage. The electric actuator includes a stepping motor configured to change the throttle opening degree of the valve body.

The variable throttle mechanism of the first expansion valve 13 has a fully opening function that fully opens the refrigerant passage when an opening degree of the first expansion valve 13 is maximized. As such, the first expansion valve 13 does not reduce a pressure of the refrigerant when the refrigerant passage is fully open. An operation of the first expansion valve 13 is controlled based on a control signal output from a controller 40. The controller 40 will be described later in greater detail.

The exterior heat exchanger 14 is configured as an air-refrigerant heat exchanger that exchanges heat between the refrigerant flowing out of the first expansion valve 13 and outside air. When the refrigerant flowing through the exterior heat exchanger 14 has a temperature lower than outside air temperature, the exterior heat exchanger 14 serves as a heat sink configured to absorb heat of outside air into a refrigerant. When the refrigerant flowing through the exterior heat exchanger 14 has a temperature higher than the outside air temperature, the exterior heat exchanger 14 serves as a radiator configured to radiate heat of the refrigerant to outside air.

The radiator may be a cabin heater that condenses the refrigerant discharged from the compressor 11 to heat a cabin of a vehicle. Alternatively, the radiator may be a heating heat exchanger. The heating heat exchanger outputs a heating heat medium by condensing the refrigerant discharged from the compressor 11 to allow the refrigerant to exchange heat and heats the cabin using the heating heat medium.

The outside air is supplied to the exterior heat exchanger 14 by an exterior blower (not shown). The exterior blower is formed of an electric blower including a fan and an electric motor driving the fan. The exterior blower discharges the outside air toward the exterior heat exchanger 14. The exterior heat exchanger 14 and the exterior blower are disposed in a foremost portion of the vehicle. As such, the exterior heat exchanger 14 receives ram air while the vehicle moves.

The second expansion valve 15 is disposed downstream of the high-pressure heat exchanger 12 in a refrigerant flow.

The second expansion valve 15 according to the first embodiment is disposed downstream of the exterior heat exchanger 14.

The second expansion valve 15 is configured to decompress and expand the liquid-phase refrigerant flowing out of the high-pressure heat exchanger 12. The second expansion valve 15 configures the decompressor according to the present disclosure to function as the second decompressor.

The second expansion valve 15 includes a valve body and an electric actuator. The valve body is configured to change passage opening degree (i.e., a throttle opening degree) of a refrigerant passage. The electric actuator includes a stepping motor configured to change the throttle opening degree of the valve body. The second expansion valve 15 has operation controlled in accordance with a control signal output from the controller 40.

The second expansion valve 15 has an electric variable throttle mechanism. The variable throttle mechanism of the second expansion valve 15 has a full open function and a full close function. When the variable throttle mechanism exerts the full open function, an opening degree of the variable throttle mechanism is maximized to fully open the refrigerant passage. When the variable throttle mechanism exerts the full close function, the opening degree of the variable throttle mechanism is minimized to fully close the refrigerant passage.

As such, the second expansion valve 15 does not reduce a pressure of the refrigerant when the refrigerant passage is fully open. In addition, the second expansion valve 15 blocks a flow of the refrigerant when the refrigerant passage is fully closed.

The low-pressure heat exchanger 16 exchanges heat between the refrigerant at a low pressure discharged from the second expansion valve 15 and cooling water of a low-temperature cooling water circuit 22 to be described later to evaporate the refrigerant at the low pressure. The low-pressure heat exchanger 16 is configured as a so-called evaporator to function as the heat medium cooling evaporator according to the present disclosure. The low-pressure heat exchanger 16 evaporates to generate a gas-phase refrigerant that is drawn into the compressor 11 to be compressed.

The high-temperature cooling water circuit 21 includes the high-pressure heat exchanger 12 described above, a high-temperature pump 23, and a heater core 24. The high-temperature cooling water circuit 21 circulates cooling water serving as a heat medium by means of the high-temperature pump 23 being driven, to cause heat exchange at the high-pressure heat exchanger 12 and the heater core 24.

The cooling water at the high-temperature cooling water circuit 21 is fluid as a heat medium and serves as a high-temperature heat medium. Examples of the cooling water at the high-temperature cooling water circuit 21 according to the present embodiment include liquid at least including ethylene glycol, dimethylpolysiloxane, or nanofluid, and antifreezing liquid.

The high-temperature pump 23 is an electric heat medium pump configured to draw and discharge the cooling water at the high-temperature cooling water circuit 21. The high-temperature pump 23 is driven to circulate the cooling water at the high-temperature cooling water circuit 21.

The heater core 24 heats the air flowing toward the cabin of the vehicle by performing a heat exchange between the cooling water in the high-temperature cooling water circuit 21 and the air. The heater core 24 accordingly functions as a high-temperature heat medium heat exchanger.

In the heater core 24, the cooling water radiates heat to the air during a sensible heat change. Since the heat exchange performed by the heater core 24 is a sensible heat exchange, the cooling water is kept in a liquid phase without causing a phase change even though the cooling water radiates heat to the air flowing toward the cabin.

The low-temperature cooling water circuit 22 includes the low-pressure heat exchanger 16 described above, a low-temperature pump 25, and a cooler core 26. The low-temperature cooling water circuit 22 circulates cooling water serving as a heat medium by means of the low-temperature pump 25 being driven, to cause heat exchange at the low-pressure heat exchanger 16 and the cooler core 26.

The cooling water at the low-temperature cooling water circuit 22 is fluid as a heat medium, and corresponds to a cooling heat medium in the present disclosure. Examples of the cooling water at the low-temperature cooling water circuit 22 according to the present embodiment include liquid at least including ethylene glycol, dimethylpolysiloxane, or nanofluid, and antifreezing liquid.

The low-temperature pump 25 is an electric heat medium pump configured to draw and discharge cooling water.

The cooler core 26 is a low-temperature heat medium heat exchanger. Alternatively, the cooler core 26 may be referred to as a cabin cooler that cools the cabin by performing a heat exchange between the air flowing toward the cabin and the cooling heat medium. Specifically, the cooler core 26 cools the air flowing toward the cabin by performing a heat exchange between the cooling water in the low-temperature cooling water circuit 22 and the air flowing toward the cabin. In the cooler core 26, the cooling water absorbs heat from the air during a sensible heat change. Since the heat exchange performed by the cooler core 26 is a sensible heat exchange, the cooling water is kept in a liquid phase without causing a phase change even though the cooling water absorbs heat from the air flowing toward the cabin.

The interior air conditioning unit 30 included in the air conditioner 1 for a vehicle will be described next with reference to the drawings. The interior air conditioning unit 30 is disposed inside an instrument panel or the like provided in a foremost portion of the cabin.

The interior air conditioning unit 30 includes a casing 31 serving as an outer shell and accommodating the heater core 24, the cooler core 26, an interior blower 32, an inside-outside air switching device 33, a cool-air bypass passage 35, an air mix door 36, and the like.

The casing 31 defines an air passage therein through which the air flows toward the cabin. The casing 31 is made of a resin having certain elasticity and excellent strength (e.g., polypropylene).

The inside-outside air switching device 33 is disposed in the casing 31 at an uppermost stream position in a flow direction of the air. The inside-outside air switching device 33 selectively introduces air inside the cabin and outside air. The air inside the cabin will be referred to as inside air hereafter. Specifically, the inside-outside air switching device 33 is provided with an inside air introducing port allowing inside air to be introduced into the casing 31 and an outside air introducing port allowing outside air to be introduced into the casing 31.

The inside-outside air switching device 33 is further provided therein with an inside-outside air switching door. The inside-outside air switching door continuously regulates opened areas of the inside air introducing port and the outside air introducing port to change a volume ratio between inside air and outside air.

The interior blower 32 is disposed in the casing 31, downstream of the inside-outside air switching device 33 in an air flow. The interior blower 32 sends air introduced through the inside-outside air switching device 33 toward the cabin.

Specifically, the interior blower 32 is an electric blower including a centrifugal multi-vane fan 32a (e.g., sirocco fan) driven by an electric motor 32b. The interior blower 32 has rotational speed (e.g., a ventilation level) controlled in accordance with a control signal (e.g., control voltage) output from the controller 40 to be described later.

As depicted in FIG. 1, the heater core 24 and the cooler core 26 are disposed downstream of the interior blower 32 in the flow direction of the air. The cooler core 26 is disposed upstream of the heater core 24 in the flow direction of the air flowing toward the cabin.

The casing 31 accommodates the cool-air bypass passage 35 allowing the air having passed through the cooler core 26 to flow while bypassing the heater core 24.

The air mix door 36 is disposed downstream of the cooler core 26 in the air flow as well as upstream of the heater core 24 in the air flow. The air mix door 36 includes a rotary shaft rotatably supported by the casing 31 and a door base board coupled to the rotary shaft.

The rotary shaft of the air mix door 36 is driven by a servomotor. The servomotor has operation controlled by the controller 40. The air mix door 36 is thus configured to regulate a volume ratio between air caused to pass through the heater core 24 and air caused to pass through the cool-air bypass passage 35 in the air having passed through the cooler core 26.

The heater core 24 and the cool-air bypass passage 35 are provided, downstream thereof in the air flow thereof, with a mixing space. The mixing space is provided to mix the air having passed through the heater core 24 and the air having passed through the cool-air bypass passage 35.

Air outlets are formed in a most downstream portion of the casing 31 in the flow direction of the air. The air outlets discharge a conditioned air, which is provided in the mixing space, toward the cabin as an air conditioning target space.

Specifically, the air outlets formed in the casing 31 includes a face air outlet, a foot air outlet, and a defroster air outlet. The face air outlet discharges the conditioned air toward an upper body of an occupant in the cabin. The foot air outlet discharges the conditioned air toward feet of the occupant. The defroster air outlet discharges the conditioned air toward an inner surface of a front windshield of the vehicle.

The air mix door 36 adjusts a ratio between a volume of the air passing through the high-pressure heat exchanger 12 and a volume of the air passing through the cool-air bypass passage 35 so that a temperature of the conditioned air provided in the mixing space is adjusted. Thus, the temperature of the conditioned air discharged from the air outlets is adjusted.

A face door, a foot door, and a defroster door are arranged upstream of the face air outlet, the foot air outlet, and the defroster air outlet respectively along the flow direction of the air. The face door adjusts an opening area of the face air outlet. The foot door adjusts an opening area of the foot air outlet. The defroster door adjusts an opening area of the defroster air outlet.

The face door, the foot door, and the defroster door are configured to switch among air outlet modes, and are each driven, via a link mechanism or the like, by a servomotor having operation controlled in accordance with a control signal output from the controller 40 as to be described later.

The refrigeration cycle device 10 will be described next in terms of its control system with reference to FIG. 2. The controller 40 controls operation of various control target device included in the refrigeration cycle device 10. The controller 40 is configured by a well-known microcomputer including a CPU, a ROM, a RAM, and the like, as well as a peripheral circuit of the microcomputer.

The controller 40 executes various arithmetic operation and processing in accordance with a control program stored in the ROM. The ROM in the controller 40 stores the control program depicted in FIG. 3.

The controller 40 has an output end connected to the various control target device. Examples of the control target device controlled by the controller 40 include the compressor 11, the first expansion valve 13, the second expansion valve 15, the high-temperature pump 23, and the low-temperature pump 25.

The controller 40 includes software and hardware that control an electric motor of the compressor 11 and that configure a control section for controlling a refrigerant discharge capability. The controller 40 includes software and hardware that control the first expansion valve 13 and that configure a control section for controlling a first decompression level. The controller 40 includes software and hardware that control the second expansion valve 15 and that configure a control section for controlling a second decompression level.

The controller 40 includes software and hardware that control the high-temperature pump 23 and that configure a control section for controlling a flow rate of the heat medium at a high-temperature. The controller 40 includes software and hardware that control the low-temperature pump 25 and that configure a control section for controlling a flow rate of the heat medium at a low-temperature.

The controller 40 has an input end connected to sensors including various sensors. The sensors according to the present embodiment include an inside-air temperature sensor 41, an outside-air temperature sensor 42, an insolation sensor 43, a cooler-core temperature sensor 44, a cool-air output temperature sensor 45, a cooling-water temperature sensor 46, a refrigerant pressure sensor 47, a refrigerant temperature sensor 48, and a battery temperature sensor 49. The cooler-core temperature sensor 44, the cool-air output temperature sensor 45, the cooling-water temperature sensor 46, the refrigerant pressure sensor 47, the refrigerant temperature sensor 48, and the battery temperature sensor 49 each configure the detector according to the present disclosure.

The inside-air temperature sensor 41 detects cabin temperature Tr. The outside-air temperature sensor 42 detects outside air temperature Tam. The insolation sensor 43 detects solar radiation quantity Ts in the cabin.

The cooler-core temperature sensor 44 detects temperature of a body of the cooler core 26. The cooler-core temperature sensor 44 is attached to a fin or a tank included in the cooler core 26.

The cool-air output temperature sensor 45 detects temperature of air having passed through the cooler core 26. The cool-air output temperature sensor 45 is disposed downstream of the cooler core 26 in the air flow as well as upstream of the air mix door 36 and the heater core 24 in the air flow.

The cooling-water temperature sensor 46 detects temperature of the cooling water circulating in the low-temperature cooling water circuit 22. The cooling-water temperature sensor 46 is attached to a duct of the cooling water flowing between the low-pressure heat exchanger 16 and the cooler core 26.

The refrigerant pressure sensor 47 detects pressure of the refrigerant flowing in a low pressure portion in the refrigeration circuit. The low pressure portion is exemplarily provided from an outflow port of the first expansion valve 13 to an inlet port of the compressor 11. The refrigerant pressure sensor 47 according to the first embodiment is attached to an outflow port of the low-pressure heat exchanger 16.

The refrigerant temperature sensor 48 detects temperature of the refrigerant flowing in the low pressure portion in the refrigeration circuit. The refrigerant temperature sensor 48 according to the first embodiment detects temperature of the refrigerant flowing from an outflow port of the exterior heat exchanger 14 toward an inflow port of the low-pressure heat exchanger 16.

The battery temperature sensor 49 detects temperature of the battery 27 mounted on the vehicle. As described above, the battery 27 stores electric power used for driving the travel electric motor, the sub-assembly of the refrigeration cycle device 10, and the like.

Each of the sensors may alternatively be configured to detect a measured value obtained through actually measuring temperature or pressure. Each of the sensors may still alternatively be configured to detect an estimated value relevant to the temperature or the pressure of detection target equipment in accordance with physical quantity correlated closely with the temperature or the pressure. The physical quantity is exemplified by temperature of a sub-assembly other than the detection target equipment.

The input end of the controller 40 is connected to an operation panel 50 disposed adjacent to the instrument panel in a front portion of the cabin. The operation panel 50 is provided with various operation switches to be operated by a crew. The controller 40 receives operation signals from the various operation switches.

The various operation switches of the operation panel 50 include an air conditioning switch, a temperature setting switch, and the like. The air conditioning switch sets whether the interior air conditioning unit 30 is operated to cool the air supplied into the cabin. The temperature setting switch is operated to set desired temperature of the cabin.

The air conditioner 1 for a vehicle including the refrigeration cycle device 10 will be described next in terms of its operation. The controller 40 initially sets an air conditioning mode of the air conditioner 1 for a vehicle to any one of the heating mode, the cooling mode, and the dehumidifying and heating mode in accordance with a target air temperature TAO or the like.

The target air temperature TAO is a temperature of the air flowing into the cabin. The controller 40 calculates the target air temperature TAO in accordance with the following formula.

$$TAO = Kset \times Tset - Kr \times Tr - Kam \times Tam - Ks \times Ts + C$$

The formula includes Tset indicating cabin set temperature set by means of the temperature setting switch at the operation panel 50, and Tr indicating inside air temperature detected by the inside-air temperature sensor 41. The formula further includes Tam indicating outside air temperature detected by the outside-air temperature sensor 42, and Ts indicating solar radiation quantity detected by the insolation sensor 43. The formula also includes Kset, Kr, Kam, and Ks indicating control gains, and C indicating a correction constant.

Operation in the heating mode, the cooling mode, and the dehumidifying and heating mode will be described next.

(Heating Mode)

The controller 40 in the heating mode throttles the first expansion valve 13 and fully opens the second expansion valve 15. The controller 40 in the heating mode drives the high-temperature pump 23 and stops the low-temperature pump 25.

The controller 40 determines operation states of various control equipment connected to the controller 40 in accordance with the target air temperature TAO, detection signals from the sensors, and the like. The operation states of the various control equipment are indicated by control signals output to the various control equipment.

The control signal output to the first expansion valve 13 is determined such that the refrigerant flowing into the first expansion valve 13 has subcooling degree approaching preliminarily determined target subcooling degree. The target subcooling degree is determined to cause a coefficient of performance (COP) of the cycle to approach a maximum value.

A control signal output to the servomotor of the air mix door 36 is set so that the air mix door 36 fully opens the air passage in which the heater core 24 is disposed. As such, an entire of the air passing through the cooler core 26 passes through the air passage in which the heater core 24 is disposed.

A state of the refrigerant circulating in the refrigeration circuit in the heating mode will be described hereafter.

The compressor 11 in the heating mode discharges the refrigerant at a high pressure that flows into the high-pressure heat exchanger 12 and radiates heat through heat exchange with the cooling water at the high-temperature cooling water circuit 21. The cooling water at the high-temperature cooling water circuit 21 is accordingly cooled.

The refrigerant having flowed out of the high-pressure heat exchanger 12 then flows into the first expansion valve 13 and is decompressed to become the refrigerant at a low pressure. The refrigerant at the low pressure obtained through decompression at the first expansion valve 13 flows into the exterior heat exchanger 14 and absorbs heat from the outside air discharged from the exterior blower (not depicted) to be evaporated.

The refrigerant having flowed out of the exterior heat exchanger 14 flows into the second expansion valve 15. The second expansion valve 15 is fully opened in this case, so that the refrigerant having flowed out of the exterior heat exchanger 14 flows into the low-pressure heat exchanger 16 without being decompressed in the second expansion valve 15.

The low-temperature pump 25 is stopped in the heating mode, so that the cooling water at the low-temperature cooling water circuit 22 does not circulate to the low-pressure heat exchanger 16. The refrigerant at the low pressure in the low-pressure heat exchanger 16 thus flows out of the low-pressure heat exchanger 16 with almost no absorption of heat from the cooling water at the low-temperature cooling water circuit 22.

The refrigerant having flowed out of the low-pressure heat exchanger 16 flows to the inlet port of the compressor 11 to be compressed again by the compressor 11.

In the heating mode, the high-pressure heat exchanger 12 causes heat of the refrigerant at the high pressure discharged from the compressor 11 to be radiated to the cooling water at the high-temperature cooling water circuit 21, and the heater core 24 causes heat of the cooling water at the high-temperature cooling water circuit 21 to be radiated to the air flowing toward the cabin.

The refrigeration cycle device 10 supplies the heated air into the cabin when being operated in the heating mode. The refrigeration cycle device 10 accordingly achieves heating the cabin.

(Cooling Mode)

The controller 40 in the cooling mode fully opens the first expansion valve 13 and throttles the second expansion valve 15. The controller 40 in the cooling mode stops the high-temperature pump 23 and drives the low-temperature pump 25.

The controller 40 determines operation states of various control equipment connected to the controller 40 in accordance with the target air temperature TAO, detection signals from the sensors, and the like.

The control signal output to the second expansion valve 15 is determined such that the refrigerant flowing into the second expansion valve 15 has subcooling degree approaching the target subcooling degree. The target subcooling degree is preliminarily determined to cause the COP to approach the maximum value.

A control signal output to the servomotor of the air mix door 36 is set so that the air mix door 36 fully closes the air passage in which the heater core 24 is disposed. As such, an entire of the air passing through the cooler core 26 passes through the cool-air bypass passage 35.

A state of the refrigerant circulating in the refrigeration circuit in the cooling mode will be described hereafter.

The compressor 11 in the cooling mode discharges the refrigerant at the high pressure that flows into the high-pressure heat exchanger 12. The high-temperature pump 23 is stopped in this case, so that the cooling water at the high-temperature cooling water circuit 21 does not circulate to the high-pressure heat exchanger 12. The refrigerant having flowed into the high-pressure heat exchanger 12 thus flows out of the high-pressure heat exchanger 12 with almost no heat exchange with the cooling water at the high-temperature cooling water circuit 21.

The refrigerant having flowed out of the high-pressure heat exchanger 12 flows into the first expansion valve 13. The first expansion valve 13 fully opens the refrigerant passage in the cooling mode. The refrigerant having flowed out of the high-pressure heat exchanger 12 accordingly flows into the exterior heat exchanger 14 without being decompressed in the first expansion valve 13.

The refrigerant having flowed into the exterior heat exchanger 14 then radiates heat to outside air discharged from the exterior blower at the exterior heat exchanger 14. The refrigerant having flowed out of the exterior heat exchanger 14 flows into the second expansion valve 15 to be decompressed and expanded to become the refrigerant at the low pressure at the second expansion valve 15.

The refrigerant at the low pressure obtained through decompression at the second expansion valve 15 flows into the low-pressure heat exchanger 16 and absorbs heat from the cooling water at the low-temperature cooling water circuit 22 to be evaporated. The cooling water at the low-temperature cooling water circuit 22 is accordingly cooled. The cooler core 26 cools the air flowing toward the cabin.

The refrigerant having flowed out of the low-pressure heat exchanger 16 flows to the inlet port of the compressor 11 to be compressed again by the compressor 11.

The low-pressure heat exchanger 16 in the cooling mode executes heat exchange with the refrigerant at the low pressure to cool the cooling water at the low-temperature cooling water circuit 22. The cooler core 26 thus cools the air flowing toward the cabin using the cooling water.

The refrigeration cycle device 10 supplies the cool air into the cabin when being operated in the cooling mode. The refrigeration cycle device 10 accordingly achieves cooling the cabin.

(Dehumidifying and Heating Mode)

The controller 40 in the dehumidifying and heating mode causes each of the first expansion valve 13 and the second expansion valve 15 to have predetermined opening degree. According to the first embodiment, the first expansion valve 13 has an opening degree of a predetermined value, and the second expansion valve 15 has the fully opening degree. The controller 40 in the dehumidifying and heating mode drives both the high-temperature pump 23 and the low-temperature pump 25.

The controller 40 determines operation states of various control equipment connected to the controller 40 in accordance with the target air temperature TAO, detection signals from the sensors, and the like.

The control signal output to the servomotor of the air mix door 36 is determined such that the air mix door 36 fully opens the air passage of the heater core 24 and air having passed through the cooler core 26 entirely passes through the air passage of the heater core 24.

In the dehumidifying and heating mode, the controller 40 adjusts the opening degree of each of the first expansion valve 13 and the second expansion valve 15 to a predetermined degree based on the target air temperature TAO, the detection signals from the sensors, or the like. As such, a decompression level, which is a degree as to how much the refrigerant is decompressed, in the first expansion valve 13 and a decompression level, which is a degree as to how much the refrigerant is decompressed, in the second expansion valve 15 are set. The state in which each of the opening degrees of the first expansion valve 13 and the second expansion valve 15 are set at the predetermined degree based on the target air temperature TAO, the detection signals from the sensors, or the like will be referred to as an ordinary state hereafter.

A state of the refrigerant circulating in the refrigeration circuit in the dehumidifying and heating mode will be described hereafter.

The compressor 11 discharges the refrigerant at the high pressure that flows into the high-pressure heat exchanger 12 and radiates heat through heat exchange with the cooling water at the high-temperature cooling water circuit 21. The cooling water at the high-temperature cooling water circuit 21 is accordingly cooled.

The refrigerant having flowed out of the high-pressure heat exchanger 12 then flows into the first expansion valve 13 and is decompressed to become the refrigerant at the low pressure. The refrigerant at the low pressure decompressed in the first expansion valve 13 flows into the exterior heat exchanger 14 and radiates heat to outside air discharged from the exterior blower.

The refrigerant having flowed out of the exterior heat exchanger 14 then flows into the second expansion valve 15. The second expansion valve 15 is fully opened in this case, so that the refrigerant having flowed out of the exterior heat exchanger 14 flows into the low-pressure heat exchanger 16 without being decompressed in the second expansion valve 15.

The refrigerant at the low pressure in the low-pressure heat exchanger 16 absorbs heat from the cooling water circulating in the low-temperature cooling water circuit 22 and is evaporated. The cooling water at the low-temperature cooling water circuit 22 is accordingly cooled.

The refrigerant having flowed out of the low-pressure heat exchanger 16 flows to the inlet port of the compressor 11 to be compressed again by the compressor 11.

Thus, in the dehumidifying and heating mode, the air, which is cooled and dehumidified in the cooler core 26, is heated in the heater core 24 and is supplied into the cabin. This achieves dehumidified and heating of the cabin.

The refrigeration cycle device 10 operating in the dehumidifying and heating mode can thus heat the cabin to have desired temperature while dehumidifying the cabin, to improve comfort of the cabin.

When the refrigeration cycle device 10 is operating in the dehumidifying and heating mode, a cooling target device (e.g., the cooler core 26 in the present embodiment) cooled by the cooling water circulating in the low-temperature cooling water circuit 22 may be subcooled to have temperature equal to or less than reference temperature. The cooling target device being subcooled to have temperature equal to or less than the reference temperature is described as being in a subcooled state.

The cooling target device is likely to be subcooled particularly under such a condition in winter when the outside air temperature is equal to or less than predetermined temperature. The cooling target device being in the subcooled state may fail to sufficiently exert expected performance.

In an exemplary case where the cooling target device is embodied by the cooler core 26 as in the first embodiment, the cooler core 26 subcooled to have temperature equal to or less than 0° C. has condensate water generated and frozen on a surface of the cooler core 26 to cause frosting. The cooler core 26 having frosting has deterioration in heat exchange capability.

On the other hand, it is required to maintain a level of a heating performance so as not to deteriorate during the dehumidifying and heating mode while preventing the cooling target device from being subcooled. As such, the controller 40 in the refrigeration cycle device 10 reads and executes the control program (shown in FIG. 3) stored in the ROM.

Figure 3:
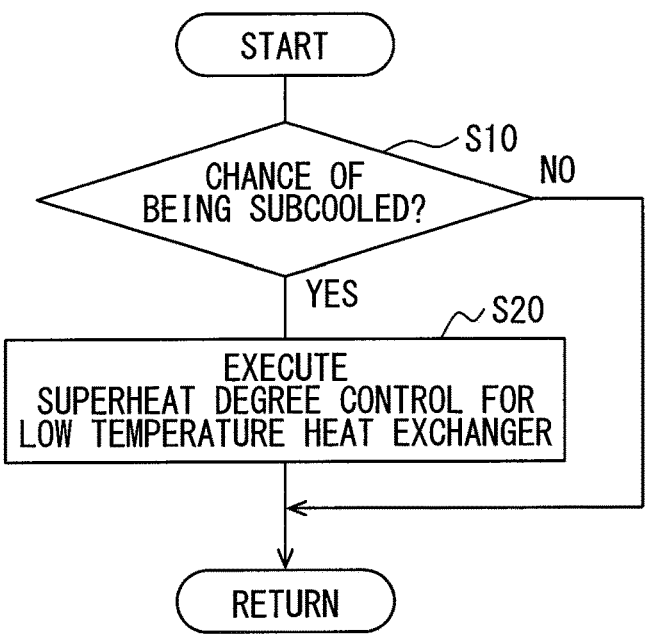
FIG. 3 is a flowchart depicting a processing flow relevant to a superheat degree control according to the first embodiment.

The controller 40 repetitively executes the control program depicted in FIG. 3 while the refrigeration cycle device 10 is operating in the dehumidifying and heating mode. However, the controller 40 may alternatively start executing the control program in association with the outside-air temperature sensor 42 when the outside air temperature becomes equal to or less than predetermined temperature (e.g., 5° C.).

First, a subcooling determination is executed at S10. In the subcooling determination, it is determined whether the cooler core 26 has a chance of being subcooled.

Specifically, the controller 40 reads detection signals from the sensors and reference values stored in the ROM or the like. The controller 40 determines whether the cooling target device has a chance of being subcooled by comparing values relating to the detection signals from the sensors and the reference values.

S10 according to the first embodiment includes comparing temperature of the cooler core 26 detected by the cooler-core temperature sensor 44 with the reference value (i.e., a reference temperature) (e.g., about 0° C.).

When the cooler core 26 has a temperature equal to or lower than the reference temperature, the controller 40 determines that the cooler core 26 is subcooled possibly (S10: YES). When the cooler core 26 is subcooled, a frost may be formed in the cooler core 26. As such, a superheat degree control is executed at S20 to suppress a formation of the frost in the cooler core 26. The superheat degree control performed at S20 will be described later in greater detail.

On the other hand, when the temperature of the cooler core 26 is higher than the reference temperature, the controller 40 determines that the cooler core 26 has no chance of being subcooled (S10: NO). Then, the controller 40 ends the control program. Subsequently, the controller 40 restarts the control program shown in FIG. 3 and executes the processing of S10.

When the process flow advances to S20, the controller 40 executes the superheat degree control so that the cooler core 26 as the cooling target device is prevented from being subcooled while the level of the heating performance in the dehumidifying and heating mode is maintained.

When maintaining a heating performance of the refrigeration cycle device 10 in the dehumidifying and heating mode at a fixed level, the exterior heat exchanger 14 is required to absorb a certain amount of heat. As an example, the heating performance may be a temperature of the air on a downstream side of the heater core 24.

The cooling target device in the refrigeration cycle device 10 is cooled by means of the cooling water at the low-temperature cooling water circuit 22, so that such cooling is highly influenced by temperature of the cooling water. The low-pressure heat exchanger 16 cools the cooling water circulating in the low-temperature cooling water circuit 22 by performing a heat exchange between the cooling water and the refrigerant at the low pressure. As such, it is important to control a temperature efficiency of the low-pressure heat exchanger 16 so as to prevent the cooling target device from being subcooled.

Relation between temperature efficiency of each of the air-refrigerant heat exchanger (e.g., the exterior heat exchanger 14) and the coolant-refrigerant heat exchanger (e.g., the low-pressure heat exchanger 16) and a degree of superheat of the refrigerant flowing out of the corresponding heat exchanger will be described with reference to FIG. 4.

Figure 4:
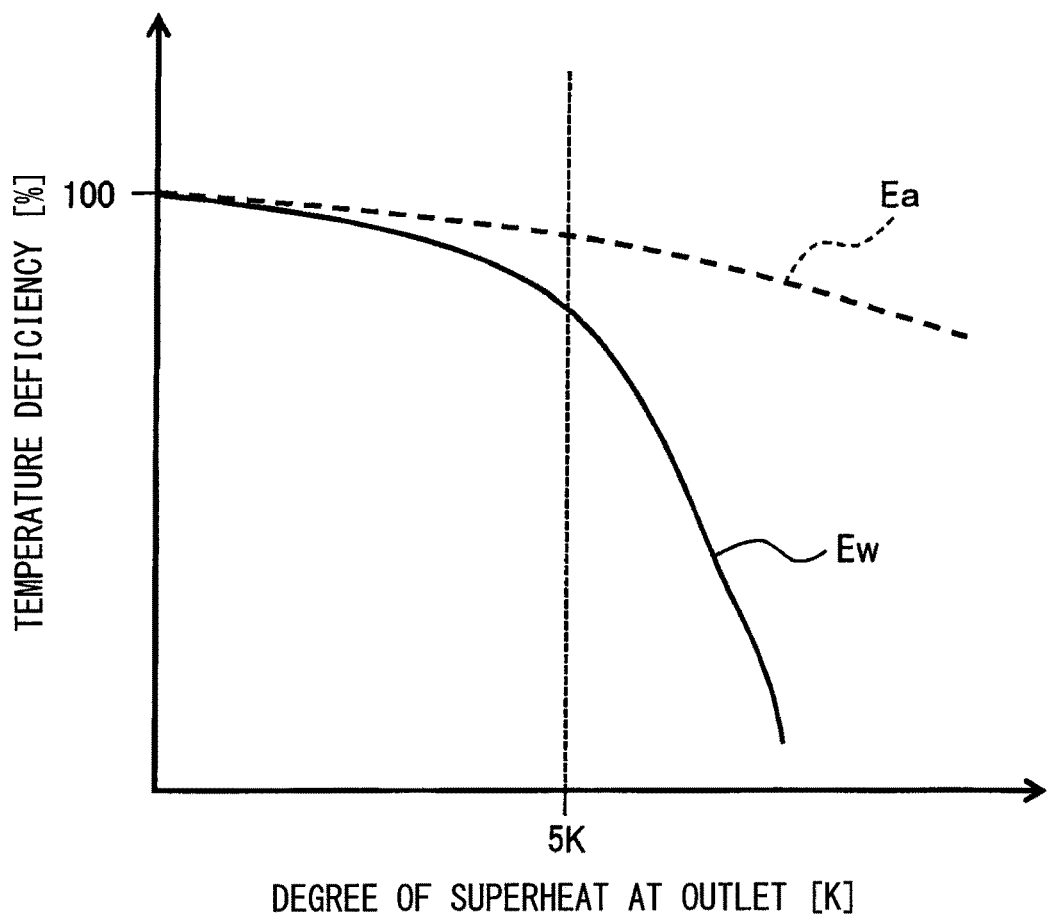
FIG. 4 is an explanatory graph indicating relation between the degree of superheat and temperature efficiency at an air-refrigerant heat exchanger as well as a coolant-refrigerant heat exchanger.

FIG. 4 includes Ea indicating temperature efficiency of the air-refrigerant heat exchanger, and Ew indicating temperature efficiency of the coolant-refrigerant heat exchanger. FIG. 4 also indicates relation between temperature efficiency and the degree of superheat of each of the air-refrigerant heat exchanger and the coolant-refrigerant heat exchanger assuming that temperature efficiency has 100 when the refrigerant flowing out of each of the air-refrigerant heat exchanger and the coolant-refrigerant heat exchanger has the degree of superheat of 1 K.

As indicated by Ea in FIG. 4, temperature efficiency of the air-refrigerant heat exchanger moderately decreases as the refrigerant flowing out of the air-refrigerant heat exchanger is increased in the degree of superheat. As indicated by Ew in FIG. 4, temperature efficiency of the coolant-refrigerant heat exchanger decreases as the refrigerant flowing out of the coolant-refrigerant heat exchanger is increased in the degree of superheat, and significantly decreases when the the degree of superheat exceeds a predetermined value.

Increase in the degree of superheat of the outgoing refrigerant leads to increase in ratio of a gas-phase refrigerant as well as decrease in ratio of a liquid-phase refrigerant in the coolant-refrigerant heat exchanger or the air-refrigerant heat exchanger. Temperature effectiveness of each of the air-refrigerant heat exchanger and the coolant-refrigerant heat exchanger thus decreases due to the decrease in ratio of the liquid-phase refrigerant in the heat exchanger.

Whereas the air-refrigerant heat exchanger performs a heat exchange between the refrigerant and air, the coolant-refrigerant heat exchanger performs a heat exchange between the refrigerant and cooling water. The cooling water has a higher specific heat than a specific heat of the air.

As such, when a degree of superheat of the refrigerant flowing out of the coolant-refrigerant heat exchanger becomes greater than a specified degree of superheat (e.g., about 5K), temperature efficiency of the coolant-refrigerant heat exchanger falls drastically as compared to temperature efficiency of the air-refrigerant heat exchanger since a temperature difference between the cooling water and the refrigerant is small.

Therefore, a cause of a drop in temperature of the cooling water when the cooling water is cooled by the refrigerant can be suppressed in a manner that the temperature efficiency of the coolant-refrigerant heat exchanger is decreased by increasing the degree of superheat of the refrigerant flowing out of the coolant-refrigerant heat exchanger.

Suppressing the cause of the drop in temperature of the cooling water results in suppressing a cause of a drop in temperature of the cooling target device cooled by the coolant. As such, the cooling target device can be prevented from being subcooled.

S20 depicted in FIG. 3 includes executing the superheat degree control based on a difference in a property relative to the degree of superheat between the air-refrigerant heat exchanger and the coolant-refrigerant heat exchanger. Specifically, S20 includes changing the degree of superheat of the refrigerant flowing out of the low-pressure heat exchanger 16 functioning as a coolant-refrigerant heat exchanger to be more than a value in the ordinary state (e.g., at least 5 K).

After such change of the degree of superheat of the refrigerant flowing out of the low-pressure heat exchanger 16 in S20, the controller 40 ends the control program. The controller 40 then restarts executing the control program depicted in FIG. 3 to execute the processing in S10.

The processing in S20 according to the first embodiment will be specifically described in detail. The controller 40 according to the first embodiment sets the decompression level of the first expansion valve 13 to be more than a decompression level in the ordinary state in order to change the degree of superheat of the refrigerant flowing out of the low-pressure heat exchanger 16 to be more than the value in the ordinary state (e.g., at least 5 K).

That is, the controller 40 decreases an opening degree (i.e., a passage sectional area) of the first expansion valve 13 as compared to an opening degree of the first expansion valve 13 in the ordinary state so that the degree of superheat of the refrigerant flowing out of the low-pressure heat exchanger 16 becomes greater than that in the ordinary state. As an example, the degree of superheat of the refrigerant flowing out of the low-pressure heat exchanger 16 may be greater than 5K.

As described above, temperature efficiency of the low-pressure heat exchanger 16 can be decreased by setting the degree of superheat of the refrigerant flowing out of the low-pressure heat exchanger 16 to be more than the value in the ordinary state.

This enables suppression of temperature decrease of the cooling water circulating in the low-temperature cooling water circuit 22 including the low-pressure heat exchanger 16, and thus enables suppression of temperature decrease of the cooling target device cooled by means of the cooling water.

Even in the case where the superheat degree control is executed, the exterior heat exchanger 14 functioning as an air-refrigerant heat exchanger exerts certain temperature efficiency kept as indicated in FIG. 4. In view of this point, the refrigeration cycle device 10 can secure heat absorption quantity at the exterior heat exchanger 14 even in the case where the cooling target device is suppressed from being subcooled.

The refrigeration cycle device 10 according to the first embodiment executes the processing in S20 to prevent subcooling and frosting at the cooler core 26 while keeping heating performance in the dehumidifying and heating mode. Furthermore, the refrigeration cycle device 10 can prevent air volume decrease caused by frosting at the cooler core 26.

Figure 5:
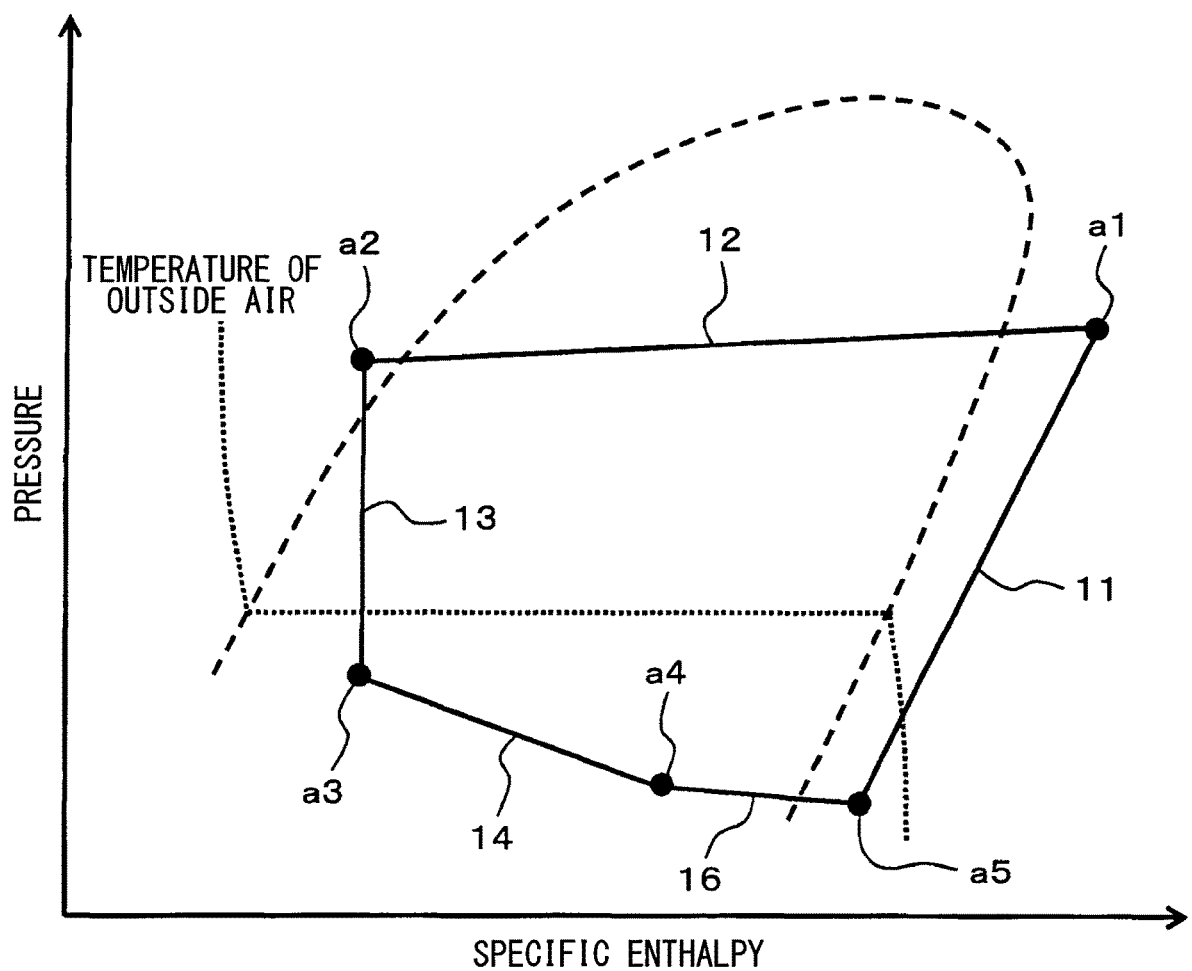
FIG. 5 is a Mollier chart indicating a state of a refrigerant in the refrigeration cycle device in a dehumidifying and heating mode according to the first embodiment.

Next, a state of the refrigerant circulating in the refrigeration circuit when the superheat degree control is performed during the dehumidifying and heating mode, with reference to Mollier chart shown in FIG. 5.

Except for the opening degree of each of the first expansion valve 13 and the second expansion valve 15, states of each of the air mix door 36, the high-temperature pump 23, the low-temperature pump 25, and the like is similar to the ordinary state in the dehumidifying and heating mode in this case.

The opening degree of the first expansion valve 13 is set to cause the degree of superheat of the refrigerant flowing out of the low-pressure heat exchanger 16 to be more than the value in the ordinary state (e.g., at least 5 K), and is changed in accordance with a control command from the controller 40. The second expansion valve 15 is set to have the fully opening degree.

At point a1 and point a2 indicated in FIG. 5, the compressor 11 discharges the refrigerant at the high pressure that flows into the high-pressure heat exchanger 12 and radiates heat through heat exchange with the cooling water at the high-temperature cooling water circuit 21. The cooling water at the high-temperature cooling water circuit 21 is accordingly cooled.

At point a2 and point a3 indicated in FIG. 5, the refrigerant having flowed out of the high-pressure heat exchanger 12 then flows into the first expansion valve 13 and is decompressed to become the refrigerant at the low pressure. At point a3 and point a4 indicated in FIG. 5, the refrigerant at the low pressure decompressed at the first expansion valve 13 flows into the exterior heat exchanger 14 and radiates heat to outside air discharged from the exterior blower.

The refrigerant having flowed out of the exterior heat exchanger 14 subsequently flows into the second expansion valve 15. The refrigerant having flowed out of the exterior heat exchanger 14 is in a gas-liquid two-phase state. The second expansion valve 15 is fully opened, so that the refrigerant having flowed out of the exterior heat exchanger 14 flows into the low-pressure heat exchanger 16 without being decompressed in the second expansion valve 15.

At point a4 and point a5 indicated in FIG. 5, the refrigerant at the low pressure refrigerant in the low-pressure heat exchanger 16 absorbs heat from the cooling water at the low-temperature cooling water circuit 22 to be evaporated. The cooling water at the low-temperature cooling water circuit 22 is accordingly cooled.

At point a5 and point a1 indicated in FIG. 5, the refrigerant having flowed out of the low-pressure heat exchanger 16 then flows to the inlet port of the compressor 11 to be compressed again by the compressor 11.

Even when the superheat degree control is performed in the dehumidifying and heating mode, the air cooled and dehumidified in the cooler core 26 is heated in the heater core 24, and the heated air is supplied into the cabin.

Even at low outside air temperature, the refrigeration cycle device 10 operating in the dehumidifying and heating mode can thus heat the cabin to reach desired temperature while dehumidifying the cabin, to improve comfort of the cabin.

Next, the subcooling state of the cooling target device with the superheat degree control and the subcooling state of the cooling target device without the superheat degree control in the refrigeration cycle device 10 in the first embodiment will be described with reference to FIG. 6.

Figure 6:
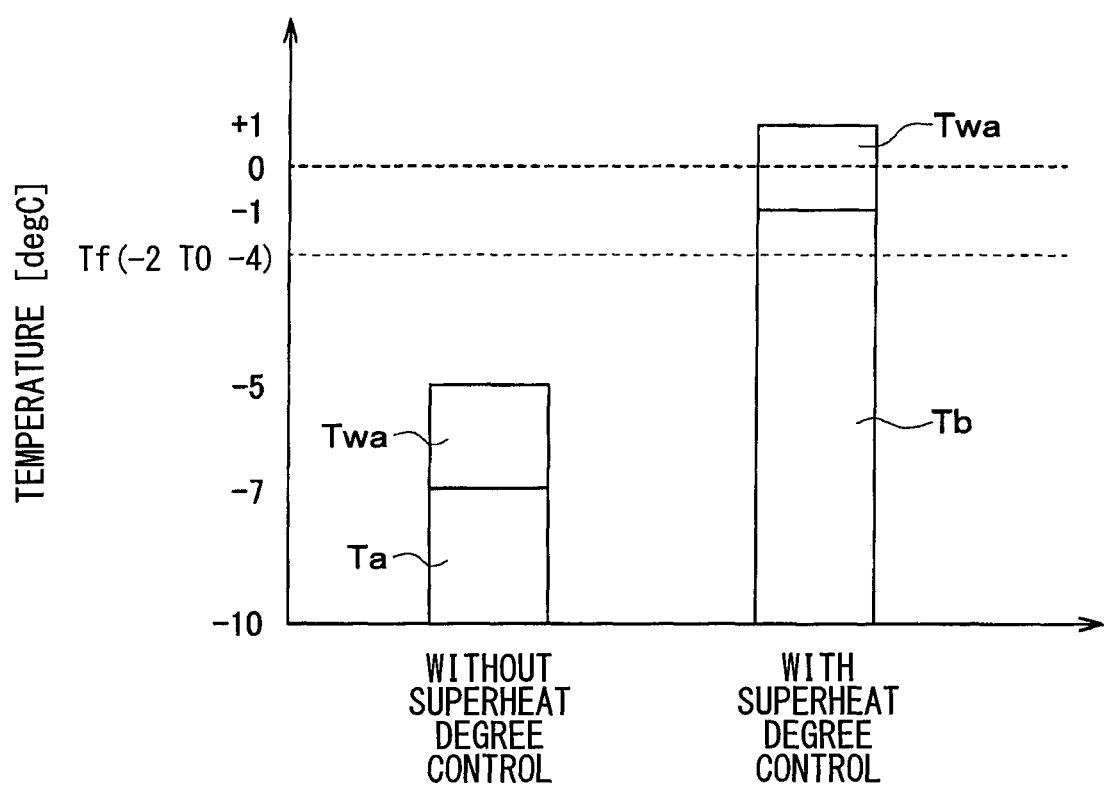
FIG. 6 is an explanatory graph indicating relation between an execution state of the superheat degree control and temperature of cooling target device in the first embodiment.

FIG. 6 indicates two examples in the states similar to those of the refrigeration cycle device 10 according to the first embodiment, except for the execution states of the superheat degree control by means of control of the opening degree of the first expansion valve 13. That is, it is assumed that the refrigeration cycle device 10 in each of the two examples is operated in the dehumidifying and heating mode under the low temperature environment and that the cooler core 26 has a chance of being subcooled (S10: YES).

First, one of the two examples in which the superheat degree control is not executed while the cooler core 26 has a chance of being subcooled will be described hereafter with reference to a left column in FIG. 6.

As having been described with reference to FIG. 5, the refrigerant circulating in the refrigeration cycle device 10 has low temperature and low pressure upon flowing into the low-pressure heat exchanger 16. The low-pressure heat exchanger 16 has temperature of −10° C. or the like at the inlet adjacent to the refrigeration circuit.

The low-pressure heat exchanger 16 exchanges heat between the refrigerant having low temperature and low pressure and the cooling water at the low-temperature cooling water circuit 22 and the cooling water is cooled in this case.

The low-pressure heat exchanger 16 thus has temperature difference (i.e., temperature change) of a first temperature variation Ta between the temperature at the inlet adjacent to the refrigeration circuit and the temperature at the outlet adjacent to the low-temperature cooling water circuit 22. As indicated in FIG. 6, the low-pressure heat exchanger 16 has temperature of −7° C. or the like at the outlet adjacent to the low-temperature cooling water circuit 22 in this case.

The cooler core 26 includes an inlet port from which the cooling water cooled in the low-pressure heat exchanger 16 flows into the cooler core 26. The cooler core 26 cools the air by performing a heat exchange between the cooling water, which flows into the cooler core 26 after being cooled in the low-pressure heat exchanger 16, and the air discharged by the interior blower 32. The air after exchanging heat with the cooling water flows out of the cooler core 26 from a discharge end of the cooler core 26.

As such, a temperature difference by an amount Tw of change in temperature of the cooler core 26 occurs between a temperature of the cooler core 26 at the inlet port taking in the cooling water and a temperature of the cooler core 26 at the discharge end of the cooler core 26 discharging the air. As an example, the temperature of the cooler core 26 at the discharge end discharging the air may be −5° C. as shown in FIG. 6.

That is, in a situation where the superheat degree control is not executed while the cooler core 26 is possibly subcooled, the temperature of the cooler core 26 at the discharge end discharging the air may fall below a frost formation temperature Tf (e.g., in a range from −4° C. to −2° C.). When the temperature of the cooler core 26 at the discharge end falls below the frost formation temperature Tf, a frost may be formed in the cooler core 26.

As described above, the cooler core 26 cannot be prevented from being subcooled without the superheat degree control. As a result, the temperature of the cooler core 26 at the discharge end discharging the air falls below the frost formation temperature Tf. When the frost is formed in the cooler core 26, the air passes through the cooler core 26 with a great ventilation resistance. As such, a volume of the air flowing from the interior blower 32 into the cabin may become smaller than a required volume.

Next, the other one of the two examples in which the superheat degree control is executed while the cooler core 26 has a chance of being subcooled will be described hereafter with reference to a right column in FIG. 6.

Also in this case, the refrigerant circulating in the refrigeration cycle device 10 has low temperature and low pressure upon flowing into the low-pressure heat exchanger 16. The low-pressure heat exchanger 16 thus has temperature of −10° C. or the like at the inlet adjacent to the refrigeration circuit.

The low-pressure heat exchanger 16 exchanges heat between the refrigerant having low temperature and low pressure and the cooling water at the low-temperature cooling water circuit 22 and the cooling water is cooled.

The controller 40 in the refrigeration cycle device 10 executes the superheat degree control in this case, by controlling the opening degree of the first expansion valve 13 to be less than the value in the ordinary state, to change the degree of superheat of the refrigerant flowing out of the low-pressure heat exchanger 16 to be more than the value in the ordinary state (e.g., at least 5 K). This lowers temperature efficiency of the low-pressure heat exchanger 16.

The low-pressure heat exchanger 16 having low temperature efficiency exchanges heat between the refrigerant having low temperature and low pressure and the cooling water at the low-temperature cooling water circuit 22. The cooling water is thus cooled through heat exchange at the low-pressure heat exchanger 16.

The cooling water has temperature decrease smaller than that of the case where the superheat degree control is not executed.

The low-pressure heat exchanger 16 has temperature difference of a second temperature variation Tb, which is larger than the first temperature variation Ta, between the temperature at the inlet adjacent to the refrigeration circuit and the temperature at the outlet adjacent to the low-temperature cooling water circuit 22. As indicated in FIG. 6, the low-pressure heat exchanger 16 has temperature of −1° C. or the like at the outlet adjacent to the low-temperature cooling water circuit 22 in this case.

The cooling water cooled in the low-pressure heat exchanger 16 flows into the cooler core 26. The cooler core 26 cools the air output from the interior blower 32 by performing a heat exchange between the cooled cooling water and the air.

As such, a temperature difference by an amount Twa of change in temperature of the cooler core 26 occurs between the temperature of the cooler core 26 at the inlet port taking in the cooling water and the temperature of the cooler core 26 at the discharge end of the cooler core 26 discharging the air. The amount Twa is the same as that without performing the superheat degree control. Therefore, the temperature of the cooler core 26 at the discharge end discharging the air may be +1° C. as shown in FIG. 6.

When the cooler core 26 has a chance of being subcooled and the superheat degree control is executed, the temperature at the discharge end of the cooler core 26 is more than the front formation temperature Tf (e.g., −4° C. to −2° C.).

By executing the superheat degree control as described above, the cooler core 26 is prevented from being subcooled and the temperature of the cooler core 26 can be kept above the frost formation temperature Tf. Thus, the air conditioner 1 for a vehicle can prevent the cooler core 26 from being subcooled and from being frosted. As such, the volume of the air flowing from the interior blower 32 into the cabin is maintained at the required volume.

As described above, the refrigeration cycle device 10 according to the first embodiment includes the compressor 11, the high-pressure heat exchanger 12, the first expansion valve 13, the exterior heat exchanger 14, the low-pressure heat exchanger 16, and the cooler core 26.

The air conditioner 1 for a vehicle includes the refrigeration cycle device 10 according to the first embodiment, the high-pressure heat exchanger 12, the high-temperature cooling water circuit 21 including the high-pressure heat exchanger 12 and the heater core 24, and the low-temperature cooling water circuit 22 including the low-pressure heat exchanger 16 and the cooler core 26.

The refrigeration cycle device 10, the high-temperature cooling water circuit 21, and the low-temperature cooling water circuit 22 each have controlled operation to enable execution of appropriately cooling, heating, and dehumidifying and heating the cabin for achievement of comfortable air conditioning of the cabin.

In the refrigeration cycle device 10 in the first embodiment, the exterior heat exchanger 14 and the low-pressure heat exchanger 16 are arranged on a downstream side of the first expansion valve 13 along a flow direction of the refrigerant as shown in FIG. 1. Specifically, the first expansion valve 13, the exterior heat exchanger 14, and the low-pressure heat exchanger 16 are connected to each other in series in this order from an upstream side to a downstream side.

The controller 40 performs the superheat degree control at S20 when determining that the cooler core 26 has a chance of being subcooled (S10: YES). In the superheat degree control, the controller 40 increases the decompression level of the first expansion valve 13 to increase the degree of superheat of the refrigerant flowing out of the low-pressure heat exchanger 16 as compared to the degree of superheat of the refrigerant flowing out of the low-pressure heat exchanger 16 in the ordinary state.

As indicated in FIG. 4, temperature efficiency between the refrigerant and the cooling water at the low-pressure heat exchanger 16 can be decreased significantly by increasing the degree of superheat of the refrigerant flowing out of the low-pressure heat exchanger 16 to be more than the value in the ordinary state.

The refrigeration cycle device 10 can thus keep temperature of the cooling water for the cooler core 26 to be equal to or more than a certain value through decrease in temperature efficiency between the refrigerant and the cooling water at the low-pressure heat exchanger 16.

Even when the refrigeration cycle device 10 is operating in the dehumidifying and heating mode under the low temperature environment, the refrigeration cycle device 10 can suppress subcooling and frosting at the cooler core 26 cooled by means of the cooling water while keeping heat absorption quantity from outside air at the exterior heat exchanger 14.

The first embodiment achieves increase in the degree of superheat of the refrigerant flowing out of the low-pressure heat exchanger 16 by decreasing the opening degree of the first expansion valve 13 to be less than the value in the ordinary state. The first embodiment does not need any additional configuration such as a constant pressure valve. The refrigeration cycle device 10 can suppress subcooling and frosting at the cooler core 26 with no increase in the number of components or no complication of a cycle configuration.

Furthermore, the first embodiment needs no configuration such as a constant pressure valve, to achieve suppression of decrease in cooling performance with no pressure loss at the constant pressure valve or the like in the cooling mode.

In the first embodiment, the cooler-core temperature sensor 44 detects a temperature of a body of the cooler core 26. At S10, the controller 40 determines whether the cooler core 26 has a chance of being subcooled by comparing the temperature of the body of the cooler core 26 and the reference temperature.

As such, according to the refrigeration cycle device 10, the controller 40 determines whether the cooler core 26 has a chance of being subcooled with high accuracy and prevents the cooler core 26 from being subcooled or being frosted appropriately.

Second Embodiment

The second embodiment different from the first embodiment described above will be described next with reference to the drawings. Similarly to the first embodiment, the second embodiment provides the refrigeration cycle device 10, and the air conditioner 1 for a vehicle includes the refrigeration cycle device 10, the high-temperature cooling water circuit 21, and the low-temperature cooling water circuit 22.

The refrigeration cycle device 10, the high-temperature cooling water circuit 21, the low-temperature cooling water circuit 22, and an interior air conditioning unit 30 according to the second embodiment are configured basically similarly to those according to the first embodiment. The second embodiment is different from the first embodiment in disposition of the configurations included in the refrigeration cycle device 10 and details of the superheat degree control executed in S20.

The following description accordingly includes the reference signs that are identical to those of the first embodiment and indicate the identical configurations described in the preceding description.

The refrigeration cycle device 10 according to the second embodiment includes the compressor 11, the high-pressure heat exchanger 12, the first expansion valve 13, the exterior heat exchanger 14, the second expansion valve 15, and the low-pressure heat exchanger 16.

Figure 7:
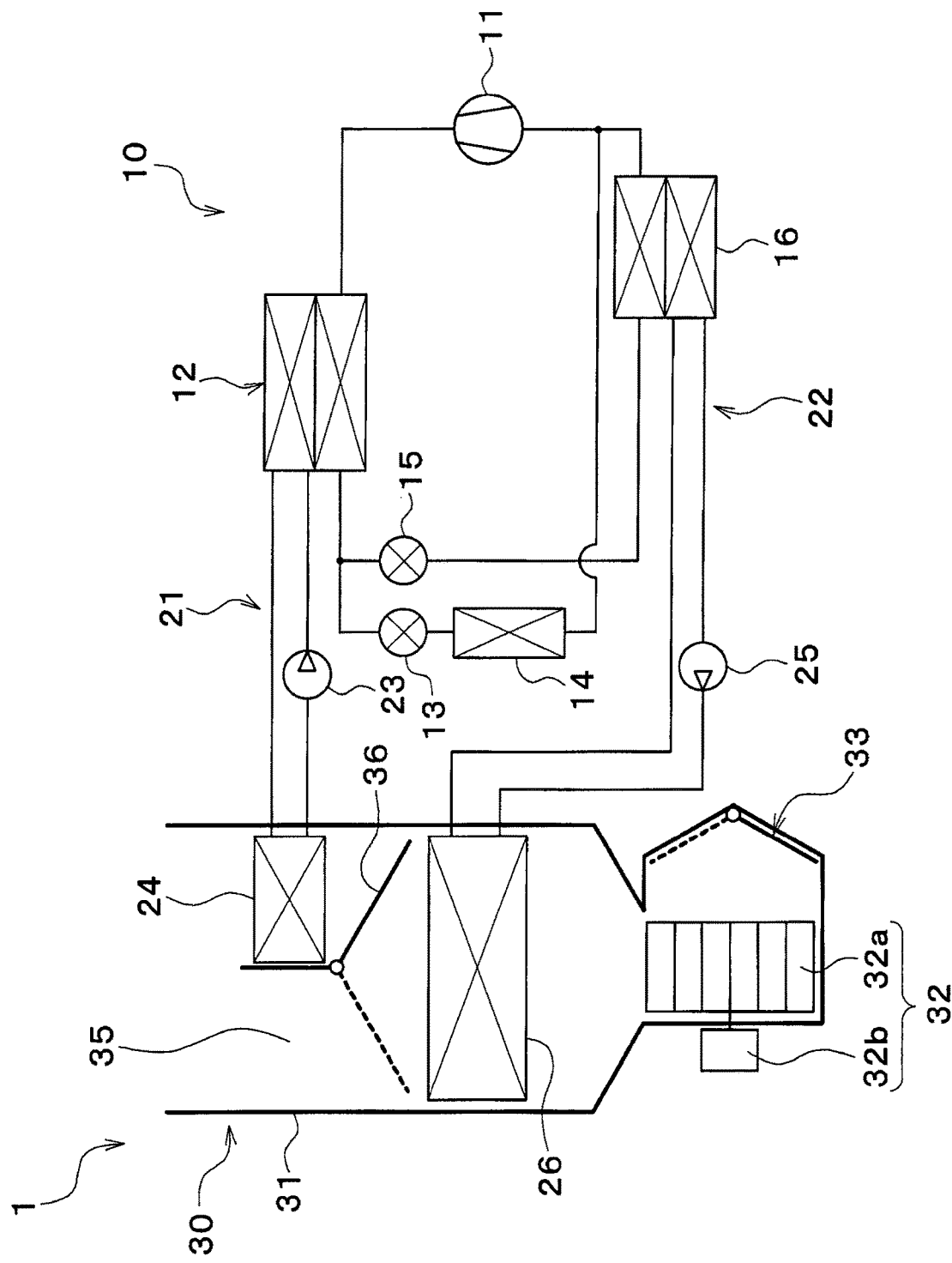
FIG. 7 is a configuration diagram of an entire refrigeration cycle device according to a second embodiment.

As depicted in FIG. 7, the second embodiment provides the first expansion valve 13 and the exterior heat exchanger 14, as well as the second expansion valve 15 and the low-pressure heat exchanger 16, which are disposed downstream of the high-pressure heat exchanger 12 and are connected parallel to each other in the refrigerant flow.

The refrigerant having flowed out of the high-pressure heat exchanger 12 according to the second embodiment is branched to have a flow into the first expansion valve 13 and a flow into the second expansion valve 15.

The refrigerant at the high pressure flows into the first expansion valve 13 and is decompressed in the first expansion valve 13 to be the refrigerant at a low pressure. The refrigerant at the low pressure flows out of the first expansion valve 13 and flows into the exterior heat exchanger 14, and then absorbs heat from the outside air discharged from the exterior blower.

On the other hand, the refrigerant at the high pressure flowing into the second expansion valve 15 is decompressed in the second expansion valve 15 to be the refrigerant at a low pressure. An opening degree of the second expansion valve 15 in the second embodiment is different from that in the first embodiment and is a specified degree.

The refrigerant at the low pressure decompressed in the second expansion valve 15 flows into the low-pressure heat exchanger 16 and exchanges heat with the cooling water circulating in the low-temperature cooling water circuit 22. The cooling water circulating in the low-temperature cooling water circuit 22 is cooled accordingly. The cooler core 26 according to the second embodiment is also cooled by the cooling water at the low-temperature cooling water circuit 22.

The refrigerant having flowed out of the exterior heat exchanger 14 and the refrigerant having flowed out of the low-pressure heat exchanger 16 merge at a location upstream of the compressor 11 and flow into the compressor 11.

The controller 40 according to the second embodiment operating in the dehumidifying and heating mode similarly reads the control program depicted in FIG. 3 from the ROM in the controller 40 and executes the control program.

The controller 40 determines whether the cooler core 26 has a chance of being subcooled at S10. Specifically, in the second embodiment, the cooler-core temperature sensor 44 detects the temperature of the cooler core 26. The controller 40 compares the temperature of the cooler core 26 and a reference temperature (e.g., about 0° C.) stored in the ROM.

The controller 40 executes the superheat degree control at S20 when the temperature of the cooler core 26 is the reference temperature or lower and the controller 40 determines that the cooler core 26 has a chance of being subcooled (S10: YES). On the other hand, the controller 40 ends the control program when the temperature of the cooler core 26 is higher than the reference temperature and the controller 40 determines that the cooler core 26 has no chance of being subcooled (S10: NO).

In S20 according to the second embodiment, the controller 40 executes the superheat degree control of setting a ratio of the decompression level of the second expansion valve 15 to the decompression level of the first expansion valve 13 to be more than a ratio in the ordinary state, to increase the degree of superheat of the refrigerant flowing out of the low-pressure heat exchanger 16.

That is, the controller 40 decreases an opening degree (i.e., a passage sectional area) of the second expansion valve 15 as compared to an opening degree of the second expansion valve 15 in the ordinary state without changing the opening degree (i.e., the passage sectional area) of the first expansion valve 13. As such, the controller 40 increases the degree of superheat of the refrigerant flowing out of the low-pressure heat exchanger 16 becomes greater than that in the ordinary state. As an example, the degree of superheat of the refrigerant flowing out of the low-pressure heat exchanger 16 may be greater than 5K.

The second embodiment also achieves decrease in temperature efficiency at the low-pressure heat exchanger 16. The refrigeration cycle device 10 can suppress temperature decrease of the cooling water circulating in the low-temperature cooling water circuit 22 including the low-pressure heat exchanger 16. The refrigeration cycle device 10 can thus suppress subcooling and frosting at the cooler core 26 cooled by means of the cooling water.

Also in the second embodiment, the exterior heat exchanger 14 functioning as an air-refrigerant heat exchanger exerts certain temperature efficiency kept as indicated in FIG. 4. In view of this point, the refrigeration cycle device 10 can secure heat absorption quantity at the exterior heat exchanger 14 even in the case where the cooling target device is suppressed from being subcooled.

The refrigeration cycle device 10 according to the second embodiment also executes the processing in S20 to prevent subcooling and frosting at the cooler core 26 while keeping heating performance in the dehumidifying and heating mode. Furthermore, the air conditioner 1 for a vehicle can prevent air volume decrease caused by frosting at the cooler core 26.

Figure 8:
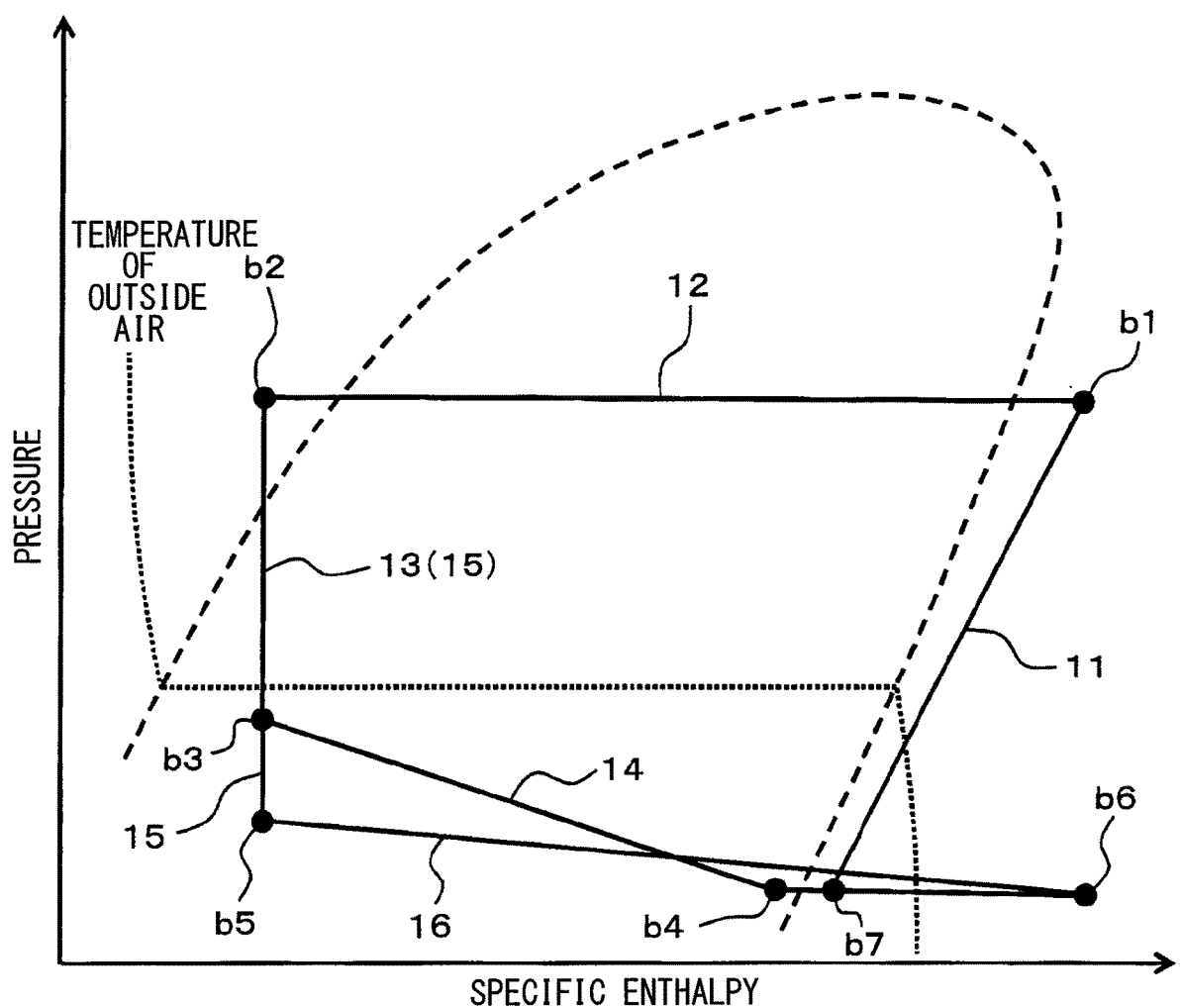
FIG. 8 is a Mollier chart indicating a state of a refrigerant in the refrigeration cycle device in a dehumidifying and heating mode according to the second embodiment.

Next, a state of the refrigerant circulating in the refrigeration circuit when the superheat degree control is performed during the dehumidifying and heating mode in the refrigeration cycle device 10 of the second embodiment with reference to Mollier chart shown in FIG. 8.

The first expansion valve 13 has an opening degree equal to the value in the ordinary state. The opening degree of the second expansion valve 15 is set to cause the degree of superheat of the refrigerant flowing out of the low-pressure heat exchanger 16 to be more than the value in the ordinary state (e.g., at least 5 K). The opening degree of the second expansion valve 15 is changed to be less than the value in the ordinary state in accordance with a control command from the controller 40.

At point b1 and point b2 indicated in FIG. 8, the compressor 11 discharges the refrigerant at the high pressure that flows into the high-pressure heat exchanger 12 and radiates heat through heat exchange with the cooling water at the high-temperature cooling water circuit 21. The cooling water at the high-temperature cooling water circuit 21 is accordingly cooled.

As described above, the refrigerant having flowed out of the high-pressure heat exchanger 12 is branched into the flow toward the first expansion valve 13 and the flow toward the second expansion valve 15.

As shown at point B2 and point b3 in FIG. 8, the refrigerant at the high pressure flowing into the first expansion valve 13 is decompressed to be the refrigerant at the low pressure. The first expansion valve 13 has an opening degree equal to the value in the ordinary state without execution of the superheat degree control.

At point b3 and point b4 indicated in FIG. 8, the refrigerant at the low pressure decompressed in the first expansion valve 13 flows into the exterior heat exchanger 14 and radiates heat to outside air discharged from the exterior blower. The refrigerant at the outlet of the exterior heat exchanger 14 comes into the gas-liquid two-phase state.

On the other hand, as shown at point b2 and point b5 in FIG. 8, the refrigerant at the high pressure flowing into the second expansion valve 15 is decompressed to be the refrigerant at a low pressure at a decompression level according to the superheat degree control described above. The opening degree of the second expansion valve 15 is changed to be less than the value in the ordinary state through the superheat degree control. The refrigerant flowing out of the second expansion valve 15 is thus lower in pressure than the refrigerant flowing out of the first expansion valve 13.

At point b5 and point b6 indicated in FIG. 8, the refrigerant at the low pressure obtained through decompression at the second expansion valve flows into the low-pressure heat exchanger 16 and absorbs heat from the cooling water at the low-temperature cooling water circuit 22 to be evaporated. The cooling water at the low-temperature cooling water circuit 22 is accordingly cooled.

The superheat degree control changes the degree of superheat of the refrigerant flowing out of the low-pressure heat exchanger 16 more significantly than an ordinary case, so that the refrigerant in the low-pressure heat exchanger 16 comes into an almost gas phase state. This lowers temperature efficiency of the low-pressure heat exchanger 16.

As such, a drop in temperature of the cooling water when being cooled in the low-pressure heat exchanger 16 is reduced as compared to a drop in temperature of the cooling water when being cooled in the low-pressure heat exchanger 16 in the ordinary state. That is, the refrigeration cycle device 10 prevents the cooling water for cooling the cooler core 26 from being subcooled, and thereby preventing the cooler core 26 from being subcooled and being frosted.

The low-pressure heat exchanger 16 has pressure loss smaller than pressure loss at the exterior heat exchanger 14 due to difference in refrigerant flow rate between the exterior heat exchanger 14 and the low-pressure heat exchanger 16.

At point b4 and point b7 as well as point b6 and point b7 indicated in FIG. 8, the refrigerant having flowed out of the exterior heat exchanger 14 joins the refrigerant having flowed out of the low-pressure heat exchanger 16. The refrigerant upon joining at point b7 indicated in FIG. 8 has the degree of superheat desired to be from 1 K to 5 K.

At point b7 and point b1 indicated in FIG. 8, the refrigerant, which has been merged at a location downstream of the exterior heat exchanger 14 and the low-pressure heat exchanger 16, flows to the inlet port of the compressor 11 to be compressed again by the compressor 11.

In the second embodiment, even when the superheat degree control is performed in the dehumidifying and heating mode, the air cooled and dehumidified in the cooler core 26 is heated in the heater core 24, and the heated air is supplied into the cabin. This achieves dehumidified and heating of the cabin.

The refrigeration cycle device 10 operating in the dehumidifying and heating mode can thus heat the cabin to have desired temperature while dehumidifying the cabin, to improve comfort of the cabin.

In the refrigeration cycle device 10 according to the second embodiment, temperature efficiency of the low-pressure heat exchanger 16 can be decreased by setting the degree of superheat of the refrigerant flowing out of the low-pressure heat exchanger 16 to be more than the value in the ordinary state.

The refrigeration cycle device 10 can thus suppress temperature decrease of the cooling water circulating in the low-temperature cooling water circuit 22 including the low-pressure heat exchanger 16, to enable suppression of temperature decrease of the cooling target device cooled by means of the cooling water.

Even when executing the superheat degree control, the temperature efficiency of the exterior heat exchanger 14 serving as the air-refrigerant heat exchanger is maintained as shown in FIG. 4. As such, the refrigeration cycle device 10 prevents the cooling target device from being subcooled and secures an amount of heat absorbed by the exterior heat exchanger 14.

That is, in the second embodiment, since the refrigeration cycle device 10 executes the superheat degree control at S20, the refrigeration cycle device 10 prevents the cooler core 26 from being subcooled while maintaining the level of the heating performance in the dehumidifying and heating mode. Furthermore, the air conditioner 1 for a vehicle prevents the volume of the air supplied into the cabin from being reduced due to the formation of a frost in the cooler core 26.

As described above, in the second embodiment, the refrigeration cycle device 10, the high-temperature cooling water circuit 21, and the low-temperature cooling water circuit 22 each have controlled operation as in the first embodiment to enable execution of appropriately cooling, heating, and dehumidifying and heating the cabin for achievement of comfortable air conditioning of the cabin.

As depicted in FIG. 7, the refrigeration cycle device 10 according to the second embodiment includes the first expansion valve 13 and the exterior heat exchanger 14, as well as the second expansion valve 15 and the low-pressure heat exchanger 16, which are disposed downstream of the high-pressure heat exchanger 12 and are connected parallel to each other in the refrigerant flow.

The controller 40 executes the superheat degree control at S20 when determining that the cooler core 26 has a chance of being subcooled (S10: YES). Specifically, the ratio of the decompression level of the second expansion valve 15 to the decompression level of the first expansion valve 13 is set to be more than the ratio in the ordinary state, for increase in the degree of superheat of the refrigerant flowing out of the low-pressure heat exchanger 16. Similarly to the first embodiment, the refrigeration cycle device 10 can thus significantly decrease temperature efficiency between the refrigerant and the cooling water at the low-pressure heat exchanger 16.

The refrigeration cycle device 10 can keep temperature of the cooling water for the cooler core 26 to be equal to or more than a certain value through decrease in temperature efficiency between the refrigerant and the cooling water at the low-pressure heat exchanger 16.

Even when the refrigeration cycle device 10 according to the second embodiment is operating in the dehumidifying and heating mode under the low temperature environment, the refrigeration cycle device 10 can suppress subcooling and frosting at the cooler core 26 cooled by means of the cooling water while keeping heat absorption quantity from outside air at the exterior heat exchanger 14.

The refrigeration cycle device 10 according to the second embodiment can suppress subcooling and frosting at the cooler core 26 with no need for any configuration such as a constant pressure valve. The refrigeration cycle device 10 has no increase in the number of components or no complication of a cycle configuration.

In addition, the cooler-core temperature sensor 44 detects the temperature of the body of the cooler core 26, and the controller 40 determines whether the cooler core 26 has a chance of being subcooled by comparing the temperature of the body of the cooler core 26 and the reference temperature. As such, the refrigeration cycle device 10 in the second embodiment also determines whether the cooler core 26 has a chance of being subcooled with high accuracy.

The superheat degree control performed at S20 in the second embodiment includes setting the opening degree of the second expansion valve 15 to be smaller than the value in the ordinary state with no change in opening degree of the first expansion valve 13. The present disclosure is, however, not limited to this aspect.

Specifically, the superheat degree control executed at S20 alternatively includes controlling the degree of superheat of the refrigerant flowing out of the low-pressure heat exchanger 16 by means of combined opening degree of the first expansion valve 13 and the second expansion valve 15.

Still alternatively, the refrigerant may have flow rate distribution to the exterior heat exchanger 14 and the low-pressure heat exchanger 16, which is regulated in accordance with the ratio between the decompression level of the first expansion valve 13 and the decompression level of the second expansion valve 15, to achieve control of the degree of superheat of the refrigerant flowing out of each of the exterior heat exchanger 14 and the low-pressure heat exchanger 16.

Third Embodiment

The third embodiment different from the above embodiments will be described next. Similarly to the above embodiments, the third embodiment provides the refrigeration cycle device 10, and the air conditioner 1 for a vehicle includes the refrigeration cycle device 10, the high-temperature cooling water circuit 21, and the low-temperature cooling water circuit 22.

The refrigeration cycle device 10, the high-temperature cooling water circuit 21, the low-temperature cooling water circuit 22, and an interior air conditioning unit 30 according to the third embodiment are basically similar in configuration and disposition to those according to the second embodiment. The third embodiment is mainly different from the second embodiment in details of the superheat degree control executed in S20.

The following description accordingly includes the reference signs that are identical to those of the first or second embodiment and indicate the identical configurations described in the preceding description.

The refrigeration cycle device 10 according to the third embodiment has disposition basically similarly to that according to the second embodiment. As depicted in FIG. 7, the refrigeration cycle device 10 according to the third embodiment includes the first expansion valve 13 and the exterior heat exchanger 14, as well as the second expansion valve 15 and the low-pressure heat exchanger 16, which are disposed downstream of the high-pressure heat exchanger 12 and are connected parallel to each other in the refrigerant flow.

The controller 40 according to the third embodiment operating in the dehumidifying and heating mode similarly reads the control program depicted in FIG. 3 from the ROM in the controller 40 and executes the control program.

The controller 40 determines whether the cooler core 26 has a chance of being subcooled at S10. Processing details of this determination are similar to those according to the above embodiments.

S20 includes executing the superheat degree control to set the degree of superheat of the refrigerant flowing out of the low-pressure heat exchanger 16 to be more than the value in the ordinary state. The third embodiment is different from the second embodiment in the processing details of the superheat degree control.

In the superheat degree control performed at S20 in the third embodiment, the controller 40 periodically decreases the opening degree (i.e., the passage sectional area) of the second expansion valve 15 without changing the opening degree (i.e., the passage sectional area) of the first expansion valve 13. Specifically, the controller 40 periodically fully closes the second expansion valve 15 to control the refrigerant to intermittently flow toward the low-pressure heat exchanger 16.

That is, the ordinary state in the present disclosure is defined as a state where each of the opening degree of the first expansion valve 13 and the opening degree of the second expansion valve 15 is equal to a specified opening degree. A superheat-degree increasing state in the present disclosure is defined as a state where the first expansion valve 13 is open with the specified opening degree and the second expansion valve 15 is fully closed.

As such, the degree of superheat of the refrigerant flowing out of the low-pressure heat exchanger 16 periodically varies between the degree of superheat in the ordinary state and the degree of superheat of the refrigerant immediately before the second expansion valve 15 is fully closed. A time average of the degree of superheat of the refrigerant flowing out of the low-pressure heat exchanger 16 becomes greater than the degree of superheat of the refrigerant in the ordinary state.

The refrigeration cycle device 10 in the third embodiment executes the superheat degree control at S20 to decrease a time averaged value of temperature efficiency at the low-pressure heat exchanger 16.

This suppresses temperature decrease of the cooling water circulating in the low-temperature cooling water circuit 22 including the low-pressure heat exchanger 16, so that the refrigeration cycle device 10 achieves suppression of temperature decrease of the cooling target device cooled by means of the cooling water.

Even in the case where the superheat degree control is executed, the exterior heat exchanger 14 functioning as an air-refrigerant heat exchanger exerts temperature efficiency kept as indicated in FIG. 4. The refrigeration cycle device 10 can thus secure heat absorption quantity at the exterior heat exchanger 14 even in the case where the cooling target device is suppressed from being subcooled.

The refrigeration cycle device 10 according to the third embodiment executes the processing in S20 to prevent subcooling and frosting at the cooler core 26 while keeping heating performance in the dehumidifying and heating mode. Furthermore, the air conditioner 1 for a vehicle can prevent air volume decrease caused by frosting at the cooler core 26.

As described above, in the third embodiment, the refrigeration cycle device 10, the high-temperature cooling water circuit 21, and the low-temperature cooling water circuit 22 each have controlled operation as in the second embodiment to enable execution of appropriately cooling, heating, and dehumidifying and heating the cabin for achievement of comfortable air conditioning of the cabin.

The refrigeration cycle device 10 according to the third embodiment includes the first expansion valve 13 and the exterior heat exchanger 14, as well as the second expansion valve 15 and the low-pressure heat exchanger 16, which are disposed downstream of the high-pressure heat exchanger 12 and are connected parallel to each other in the refrigerant flow.

With this structure, when it is determined that the cooler core 26 is possibly subcooled (S10: YES), the controller 40 periodically switches between the ordinary state and the superheat-degree increasing state at S20. As described above, a ratio of the opening degree of the second expansion valve 15 to the opening degree of the first expansion valve 13 is a specified ratio in the ordinary state. In the superheat-degree increasing state, the ratio of the opening degree of the second expansion valve 15 to the opening degree of the first expansion valve 13 is smaller than that in the ordinary state.

Similarly to the second embodiment, the refrigeration cycle device 10 can thus significantly decrease temperature efficiency between the refrigerant and the cooling water at the low-pressure heat exchanger 16.

Even when the refrigeration cycle device 10 according to the third embodiment is operating in the dehumidifying and heating mode under the low temperature environment, the refrigeration cycle device 10 can suppress subcooling and frosting at the cooler core 26 cooled by means of the cooling water while keeping heat absorption quantity from outside air at the exterior heat exchanger 14.

The refrigeration cycle device 10 according to the third embodiment can exert effect similar to that according to the second embodiment.

The superheat degree control executed at S20 in the third embodiment includes periodically fully closing the opening degree of the second expansion valve 15 with no change in opening degree of the first expansion valve 13. The present disclosure is, however, not limited to this aspect. The present disclosure can adopt various aspects if the ratio of the opening degree of the second expansion valve 15 to the opening degree of the first expansion valve 13 can periodically be made smaller than the value in the ordinary state.

In the case where the first expansion valve 13 has no change in opening degree, the second expansion valve 15 is not necessarily fully closed but may alternatively be made to have an opening degree of the second expansion valve 15 smaller than the value in the ordinary state. The opening degree of the first expansion valve 13 may still alternatively be made periodically larger than the value in the ordinary state, with no change in opening degree of the second expansion valve 15.

The second expansion valve 15 according to the third embodiment is provided as the second decompressor according to the present disclosure. The present disclosure is, however, not limited to this aspect. The present disclosure can adopt various aspects if the decompression level of the refrigerant can be changed on a flow path of the refrigerant flowing from the high-pressure heat exchanger 12 toward the low-pressure heat exchanger 16.

Figure 9:
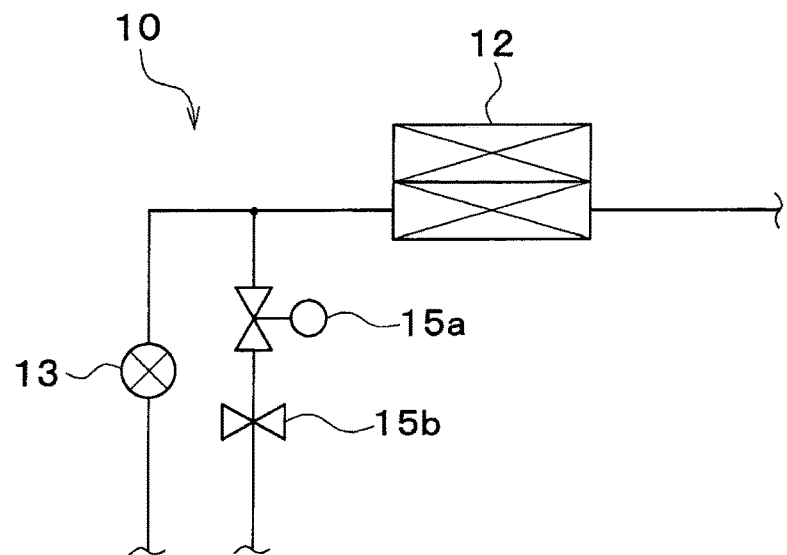
FIG. 9 is a configuration diagram of part of a refrigeration cycle device according to a third embodiment.

As exemplarily depicted in FIG. 9, the second expansion valve 15 according to the third embodiment may be replaced with an on-off valve 15a and a box expansion valve 15b positioned downstream of the on-off valve 15a.

In this case, the on-off valve 15a opens or closes the flow path of the refrigerant flowing from the high-pressure heat exchanger 12 toward the low-pressure heat exchanger 16. The box expansion valve 15b decompresses and expands a liquid-phase refrigerant flowing out of the on-off valve 15a to obtain the refrigerant at the low pressure.

The configuration depicted in FIG. 9 can also exert effect similar to that of the refrigeration cycle device 10 according to the third embodiment.

The present disclosure is not limited to such a combination between the on-off valve 15a and the box expansion valve 15b as depicted in FIG. 9, but can adopt various aspects. For example, the on-off valve 15a may alternatively have a fixed throttle disposed downstream in the refrigerant flow. This configuration can also exert effect similar to that of the refrigeration cycle device 10 according to the third embodiment.

Fourth Embodiment

The cooling target device cooled by the cooling water circulating in the low-temperature cooling water circuit 22 is not limited to the cooler core 26 in the above-described embodiments. In a fourth embodiment, the cooling target device in the present disclosure is the battery 27 for moving the vehicle. The fourth embodiment will be described hereafter with reference to FIG. 10.

Figure 10:
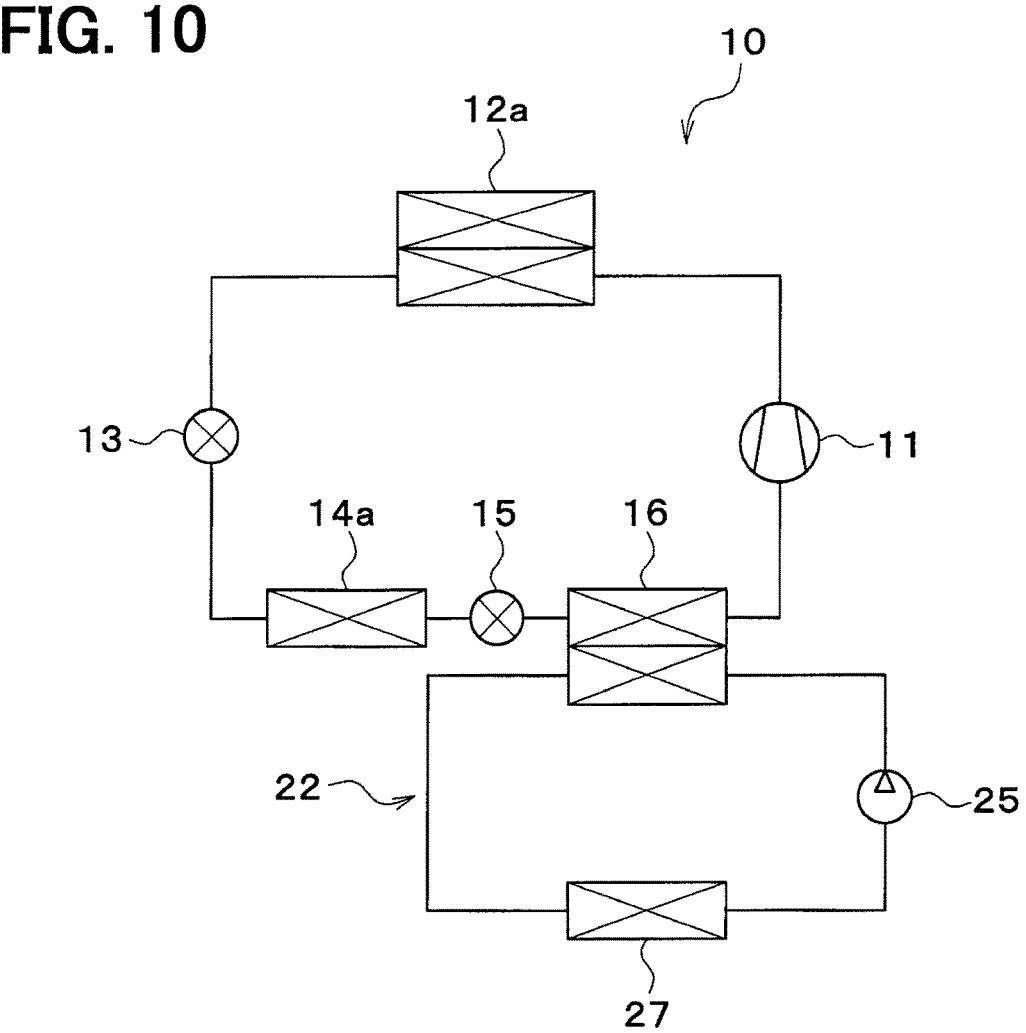
FIG. 10 is a configuration diagram of part of a refrigeration cycle device according to a fourth embodiment.

As depicted in FIG. 10, the fourth embodiment provides the refrigeration cycle device 10 including the compressor 11, an exterior heat exchanger 12a, the first expansion valve 13, a cooler 14a for a vehicle, the second expansion valve 15, and a low-pressure heat exchanger 16.

In the refrigeration cycle device 10 in the fourth embodiment, similar to the first embodiment, the first expansion valve 13, the cooler 14a for a vehicle, the second expansion valve 15, and the low-pressure heat exchanger 16 are arranged in series in this order on a downstream side of the exterior heat exchanger 12a along the flow direction of the refrigerant.

The exterior heat exchanger 12a in the fourth embodiment generates condensation heat by condensing the refrigerant discharged from the compressor 11 and radiates the condensation heat to an outside of the vehicle. The exterior heat exchanger 12a according to the fourth embodiment functions as the radiator according to the present disclosure.

The cooler 14a is provided in place of the cooler core 26 installed in the interior air conditioning unit 30, and cools the cabin through heat exchange between the refrigerant and air. The cooler 14a functions as an evaporator in the present disclosure.

The low-temperature cooling water circuit 22 according to the fourth embodiment includes the low-pressure heat exchanger 16 and the low-temperature pump 25, as well as the battery 27 as cooling target device. The low-temperature cooling water circuit 22 according to the fourth embodiment drives the low-temperature pump 25 to circulate the cooling water serving as the cooling heat medium and cool the battery 27.

In the fourth embodiment, the low-temperature cooling water circuit 22 includes a flow path through which the cooling water flows. The flow path extends along an outer surface of the battery 27 for moving the vehicle. As such, when the battery 27 generates heat, the heat is transferred to the cooling water cooled in the low-pressure heat exchanger 16 via the flow path of the low-temperature cooling water circuit 22.

In the fourth embodiment, the controller 40 similarly reads the control program depicted in FIG. 3 from the ROM in the controller 40 and executes the control program.

The controller 40 determines whether the battery 27 has a chance of being subcooled at S10. Specifically, in the fourth embodiment, the battery temperature sensor 49 detects a temperature of the battery 27. The controller 40 compares the temperature of the battery 27 and a reference temperature (e.g., about 10° C.) stored in the ROM.

The controller 40 executes the superheat degree control at S20 when the temperature of the battery 27 is the reference temperature or lower and the controller 40 determines that the battery 27 has a chance of being subcooled (S10: YES). On the other hand, the controller 40 ends the control program when the temperature of the battery 27 is higher than the reference temperature and the controller 40 determines that the battery 27 has no chance of being subcooled (S10: NO).

In S20 according to the fourth embodiment, the controller 40 executes the superheat degree control as in the first embodiment. Specifically, the controller 40 sets the decompression level of the first expansion valve 13 to be more than the value in the ordinary state, for increase in the degree of superheat of the refrigerant flowing out of the low-pressure heat exchanger 16.

The refrigeration cycle device 10 according to the fourth embodiment can also decrease temperature efficiency at the low-pressure heat exchanger 16 and can thus suppress temperature decrease of the cooling water circulating in the low-temperature cooling water circuit 22 including the low-pressure heat exchanger 16.

Thus, the refrigeration cycle device 10 prevents the battery 27, which is cooled by the cooling water, from being subcooled and eventually prevents an input performance and an output performance of the battery 27 from deteriorating.

As described above, in the refrigeration cycle device 10 in the fourth embodiment, the controller 40 executes the superheat degree control at S20 when determining that the battery 27 has a chance of being subcooled (S10: YES).

As in the first embodiment, the refrigeration cycle device 10 can significantly decrease temperature efficiency between the refrigerant and the cooling water at the low-pressure heat exchanger 16 by setting the degree of superheat of the refrigerant flowing out of the low-pressure heat exchanger 16 to be more than the value in the ordinary state.

The refrigeration cycle device 10 can keep temperature of the cooling water for the battery 27 to be equal to or more than a certain value through decrease in temperature efficiency between the refrigerant and the cooling water at the low-pressure heat exchanger 16.

Thus, in the fourth embodiment, the refrigeration cycle device 10 prevents the battery 27, which is cooled by the cooling water, from being subcooled while securing an amount of heat absorbed by the cooler 14a for a vehicle from the outside air in the low temperature environment.

In addition, the battery temperature sensor 49 detects the temperature of the body of the battery 27, and the controller 40 determines whether the battery 27 has a chance of being subcooled by comparing the temperature of the body of the battery 27 and the reference temperature. As such, the refrigeration cycle device 10 in the fourth embodiment also determines whether the battery 27 has a chance of being subcooled with high accuracy.

In the fourth embodiment, the battery 27 is prevented from being subcooled with the structure and the superheat degree control described in the first embodiment. However, the battery 27 may be prevented from being subcooled with the structure and the superheat degree control described in the second or third embodiment.

Fifth Embodiment

The fifth embodiment different from the above embodiments will be described next with reference to FIG. 11. Similarly to the first embodiment, the fifth embodiment provides the refrigeration cycle device 10, and the air conditioner 1 for a vehicle includes the refrigeration cycle device 10, the high-temperature cooling water circuit 21, and the low-temperature cooling water circuit 22.

The refrigeration cycle device 10 in the fifth embodiment is similar to that in the first embodiment and includes the compressor 11, the high-pressure heat exchanger 12, the first expansion valve 13, and the low-pressure heat exchanger 16. However, the refrigeration cycle device 10 in the fifth embodiment is different from that in the first embodiment in that the refrigeration cycle device 10 does not including the exterior heat exchanger 14 and the second expansion valve 15.

A control system in the fifth embodiment may have a similar configuration with a control system described in the first embodiment except that the control target device connected to the output side of the controller 40 does not include the second expansion valve 15. In the fifth embodiment, the controller 40 executes the control program shown in FIG. 3 to prevent the cooler core 26 from being subcooled.

The high-temperature cooling water circuit 21, the low-temperature cooling water circuit 22, and an interior air conditioning unit 30 according to the fifth embodiment are configured basically similarly to those according to the first embodiment. The following description accordingly includes the reference signs that are identical to those of the first embodiment and indicate the identical configurations described in the preceding description.

Figure 11:
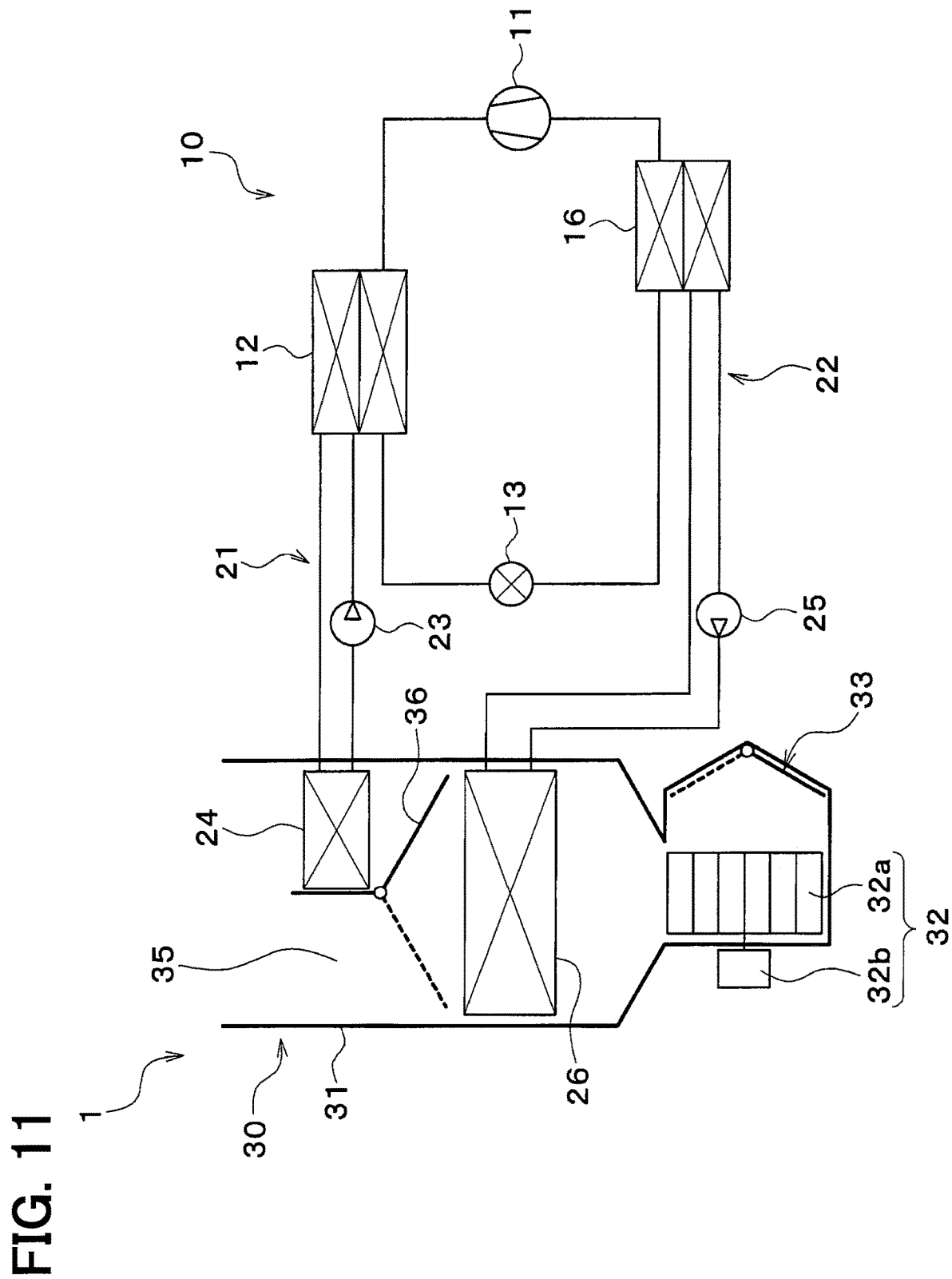
FIG. 11 is a configuration diagram of an entire refrigeration cycle device according to a fifth embodiment.

The refrigeration cycle device 10 according to the fifth embodiment is configured as a vapor compression refrigerating machine as in the first environment, and includes the compressor 11, the high-pressure heat exchanger 12, the first expansion valve 13, and the low-pressure heat exchanger 16 as depicted in FIG. 11.

In the refrigeration cycle device 10 according to the fifth embodiment, the compressor 11 discharges the refrigerant at the high pressure that flows into the high-pressure heat exchanger 12 and radiates heat through heat exchange with the cooling water at the high-temperature cooling water circuit 21, as in the first embodiment. The cooling water at the high-temperature cooling water circuit 21 is accordingly cooled. The compressor 11 functions as the compressor according to the present disclosure, and the high-pressure heat exchanger 12 functions as the radiator according to the present disclosure.

The refrigerant having flowed out of the high-pressure heat exchanger 12 then flows into the first expansion valve 13 and is decompressed to become the refrigerant at the low pressure. The refrigerant decompressed to become the refrigerant at the low pressure in the first expansion valve 13 flows as it is into the low-pressure heat exchanger 16 and exchanges heat with the cooling water circulating in the low-temperature cooling water circuit 22. The first expansion valve 13 functions as the decompressor according to the present disclosure, and the low-pressure heat exchanger 16 functions as the heat medium cooling evaporator according to the present disclosure.

The cooling water circulating in the low-temperature cooling water circuit 22 is cooled accordingly. The cooler core 26 according to the fifth embodiment is similarly cooled by the cooling water at the low-temperature cooling water circuit 22. The cooler core 26 corresponds to the cooling target device according to the present disclosure. The refrigerant having flowed out of the low-pressure heat exchanger 16 flows again into the compressor 11 to circulate in the refrigeration cycle device 10.

In the fifth embodiment, the controller 40 in the refrigeration cycle device 10 reads and executes the control program (shown in FIG. 3) stored in the ROM to prevent the cooler core 26 from being subcooled.

The controller 40 determines whether the cooler core 26 has a chance of being subcooled at S10. Specifically, in the fifth embodiment, the cooler-core temperature sensor 44 detects the temperature of the cooler core 26. The controller 40 compares the temperature of the cooler core 26 and the reference temperature (e.g., about 0° C.) stored in the ROM.

The controller 40 executes the superheat degree control at S20 when the temperature of the cooler core 26 is the reference temperature or lower and the controller determines that the cooler core 26 has a chance of being subcooled (S10: YES). On the other hand, the controller 40 ends the control program when the temperature of the cooler core 26 is higher than the reference temperature and the controller determines that the cooler core 26 has no chance of being subcooled (S10: NO).

In S20 according to the fifth embodiment, the controller 40 executes the superheat degree control of setting the decompression level of the first expansion valve 13 to be more than the value in the ordinary state in order to change the degree of superheat of the refrigerant flowing out of the low-pressure heat exchanger 16 to be more than the value in the ordinary state (e.g., at least 5 K).

That is, the controller 40 decreases the opening degree (i.e., the passage sectional area) of the first expansion valve 13 as compared to the opening degree of the first expansion valve 13 in the ordinary state so that the degree of superheat of the refrigerant flowing out of the low-pressure heat exchanger 16 becomes greater than that in the ordinary state. As an example, the degree of superheat of the refrigerant flowing out of the low-pressure heat exchanger 16 may be greater than 5K.

Thus, in the fifth embodiment, the temperature efficiency of the low-pressure heat exchanger 16 can be decreased. The decreasing in the temperature efficiency of the low-pressure heat exchanger 16 results in suppressing a cause of a drop in temperature of the cooling water circulating in the low-temperature cooling water circuit 22. Therefore, the refrigeration cycle device 10 prevents the cooler core 26 from being subcooled.

As described above, the refrigeration cycle device 10 according to the fifth embodiment includes the compressor 11, the high-pressure heat exchanger 12, the first expansion valve 13, and the low-pressure heat exchanger 16 as in the first embodiment. The refrigeration cycle device 10, the high-temperature cooling water circuit 21, and the low-temperature cooling water circuit 22 each have controlled operation for achievement of comfortable air conditioning of the cabin.

The controller 40 executes the superheat degree control at S20 when determining that the cooler core 26 has a chance of being subcooled (S10: YES). Specifically, the controller 40 increases the decompression level of the first expansion valve 13 as compared to the decompression level of the first expansion valve 13 in the ordinary state so as to increase the degree of superheat of the refrigerant flowing out of the low-pressure heat exchanger 16.

Similarly to the first embodiment, the refrigeration cycle device 10 can thus significantly decrease temperature efficiency between the refrigerant and the cooling water at the low-pressure heat exchanger 16. The refrigeration cycle device 10 can keep temperature of the cooling water for the cooler core 26 to be equal to or more than a certain value through decrease in temperature efficiency between the refrigerant and the cooling water at the low-pressure heat exchanger 16.

The refrigeration cycle device 10 in the fifth embodiment prevents the cooler core 26, which is cooled by the cooling water, from being subcooled and from being frosted. In addition, the refrigeration cycle device 10 in the fifth embodiment prevents the cooler core 26 from being subcooled without a structure such as a constant pressure valve. Thus, the refrigeration cycle device 10 is provided without increasing the quantity of components nor complicating the structure of the refrigeration circuit.

Other Embodiments

The embodiments of the present disclosure have been described above, although the present disclosure should not be limited to any one of the embodiments. The present disclosure can be modified variously within a range not departing from the gist of the present disclosure. For example, any of the above embodiments may be combined where appropriate.

The above embodiments can alternatively be modified variously as follows, for example.

(1) The cooling target device according to the present disclosure is not limited to the cooler core 26 or the battery 27 according to any one of the above embodiments. Applicable examples of the cooling target device according to the present disclosure include the following equipment.

The examples of the cooling target device according to the present disclosure include a motor configured to drive the vehicle. Subcooling of the motor by means of the cooling water leads to increase in viscosity of oil (i.e. lubricant oil) provided in the motor and deterioration in power transmission efficiency.

As an example, the cooling target device in the present disclosure may be an inverter that alternately converts between DC electricity and AC electricity for reasons given below. When the cooling water subcools the inverter, a switching element may be subcooled. When the switching element is subcooled, a dew formation may occur with high possibility.

As an example, the cooling target device in the present disclosure may be a DC-DC converter configured to convert voltage for reasons given below. When the cooling water subcools the DC-DC converter, a switching element may be subcooled. When the switching element is subcooled, a dew formation may occur with high possibility.

The cooling target device in the present disclosure may be a water-cooling intercooler configured to cool a supercharged air. Subcooling of the water-cooling intercooler by means of the cooling water allows entry, to the engine, of dew condensation water generated through the subcooling to possibly cause damage to the engine.

(2) In the above-described first, second, third and fifth embodiments, the cooler-core temperature sensor 44 detects the temperature of the cooler core 26 as the cooling target device, and the controller 40 determines whether the cooler core 26 has a chance of being subcooled at S10. However, the present disclosure is not limited to the above-described specific examples. The determination whether the cooler core 26 has a chance of being subcooled may be performed in various way.

Figure 2:
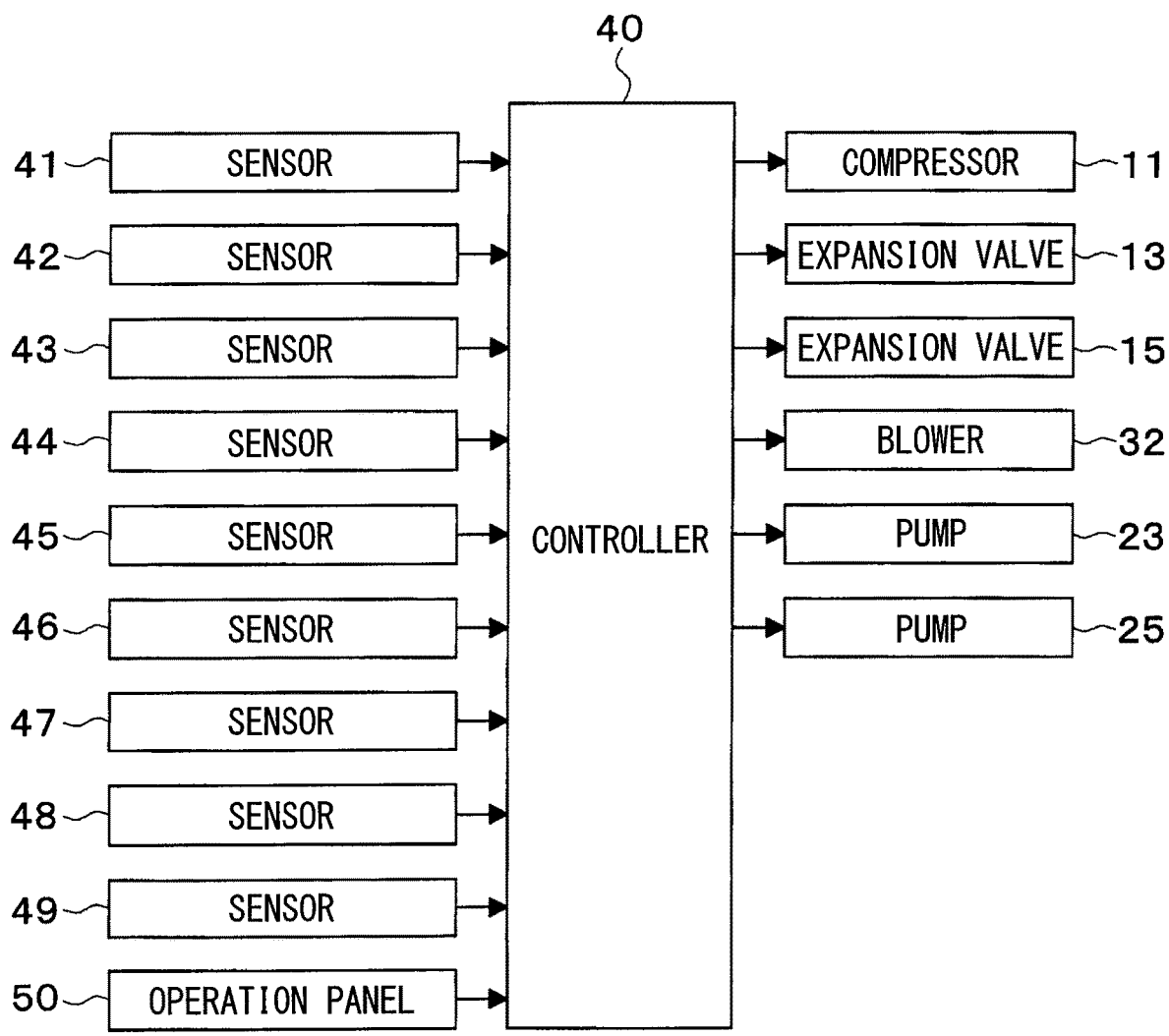
FIG. 2 is a block diagram depicting a control system of the refrigeration cycle device according to the first embodiment.

For example, the determination processing in S10 may alternatively include comparing temperature of air having passed through the cooler core 26 detected by the cool-air output temperature sensor 45 depicted in FIG. 2 and the reference value (e.g., about 0° C.) stored in the ROM.

The determination processing in S10 may still alternatively include comparing temperature of the cooling water circulating in the low-temperature cooling water circuit 22 detected by the cooling-water temperature sensor 46 depicted in FIG. 2 and the reference value (e.g., about 0° C.) stored in the ROM.

The determination processing in S10 may still alternatively include comparing pressure of the refrigerant flowing in the low pressure portion in the refrigeration circuit detected by the refrigerant pressure sensor 47 depicted in FIG. 2 and the reference value (e.g., approximately saturation pressure at about 0° C.) stored in the ROM.

Similarly, the determination processing in S10 may still alternatively include comparing temperature of the refrigerant flowing in the low pressure portion in the refrigeration circuit detected by the refrigerant temperature sensor 48 depicted in FIG. 2 and the reference value (e.g., about 0° C.) stored in the ROM.

As an example, it may be determined at S10 whether the cooler core 26 is subcooled based on various physical quantity detected by various sensors.

As an example, it may be determined whether the battery 27 is subcooled based on detection values detected by the cooling-water temperature sensor 46, the refrigerant pressure sensor, and the refrigerant temperature sensor 48. The reference value used in detecting the subcooling state may be set based on properties or the like of the cooling target device, i.e., the battery 27.

(3) The above embodiments each include sending, to the heater core 24, cooling water having high temperature and generated at the high-pressure heat exchanger 12 by means of the high-temperature pump 23 and executing heat exchanging for heating operation by means of the interior blower 32. The present disclosure is, however, not limited to this aspect. For example, the interior air conditioning unit 30 may be provided therein with an interior heat exchanger configured to exchange heat between the refrigerant at the high pressure and air, and the interior blower 32 may be operated for achievement of heat exchange and heating.

(4) The above embodiments each adopt the cooling water as a heat medium used for cooling the cooling target device. The present disclosure may alternatively adopt, as a heat medium, any one of various media such as oil.

Other examples of the heat medium include nanofluid. The nanofluid is fluid mixed with nanoparticles having a particle diameter in the order of nanometer. Mixing the nanoparticles in the heat medium achieves functional effect of obtaining antifreezing liquid having a decreased solidifying point like the cooling water including ethylene glycol, as well as the following functional effect.

The functional effect include improvement in thermal conductivity in a specific temperature range, increase in thermal capacity of the heat medium, anticorrosion of metal piping and prevention of deterioration of rubber piping, and improvement in fluidity of the heat medium at extremely low temperature.

Such functional effect changes variously in accordance with a configuration, shapes, a combination ratio, and an added substance of the nanoparticles.

Improvement in thermal conductivity achieves substantially equal cooling efficiency even with a heat medium smaller in quantity than the cooling water including ethylene glycol.

Increase in thermal capacity of the heat medium achieves increase in stored cold heat quantity due to sensible heat of the heat medium itself.

Such increase in stored cold heat quantity achieves temperature regulation upon cooling or heating equipment utilizing stored cold heat for a certain period even in a state where the compressor 11 is not in operation.

The nanoparticles has an aspect ratio of preferably at least 50. Such an aspect ratio achieves sufficient thermal conductivity. The aspect ratio is a shape index indicating a ratio between vertical size and horizontal size of the nanoparticles.

Applicable nanoparticles include any of Au, Ag, Cu, and C. Specifically, each of the nanoparticles can include, as a constituent atom, an Au nanoparticle, an Ag nanowire, a CNT, graphene, a graphite core shell nanoparticle, or a CNT containing Au nanoparticles.

The CNT stands for carbon nanotube. The graphite core shell nanoparticle includes a structure like a carbon nanotube surrounding the atom.

(5) The refrigeration cycle device 10 according to each of the above embodiments includes a fluorocarbon refrigerant. The present disclosure is, however, not limited to this case in terms of a type of refrigerant. Applicable examples of the refrigerant according to the present disclosure include a natural refrigerant such as carbon dioxide, as well as a hydrocarbon refrigerant.

The refrigeration cycle device 10 according to each of the above embodiments configures the subcritical refrigeration circuit having high refrigerant pressure not exceeding the critical pressure of the refrigerant. The refrigeration cycle device 10 may alternatively configure a supercritical refrigeration circuit having high refrigerant pressure exceeding the critical pressure of the refrigerant.

The invention claimed is:

1. A refrigeration cycle device comprising:
a compressor that compresses a refrigerant and discharges the refrigerant;
a radiator that allows the refrigerant discharged from the compressor to radiate heat;
a decompressor that decompresses the refrigerant flowing into the decompressor after radiating heat in the radiator;
an evaporator that evaporates the refrigerant by performing a heat exchange between the refrigerant decompressed in the decompressor and air;
a heat medium cooling evaporator that cools a cooling heat medium by performing a heat exchange between the refrigerant decompressed in the decompressor and the cooling heat medium, the cooling heat medium having a specific heat greater than a specific heat of the air;
a cooling target device that is cooled by the cooling heat medium flowing into the cooling target device after exchanging heat with the refrigerant in the heat medium cooling evaporator;
a detector that is configured to detect a subcooling state of the cooling target device having a temperature lower than or equal to a reference temperature; and
a controller that increases a degree of superheat of the refrigerant flowing out of the heat medium cooling heat exchanger upon the detection of the subcooling state of the cooling target device by the detector as compared to a degree of superheat of the refrigerant flowing out of the heat medium cooling heat exchanger when the detector does not detect the subcooling state.

2. The refrigeration cycle device of claim 1, wherein
the evaporator is located downstream of the decompressor and is connected to the decompressor in series in a flow direction of the refrigerant,
the heat medium cooling evaporator is located downstream of the evaporator and is connected to the evaporator in series in the flow direction of the refrigerant, and
the controller increases a decompression level of the decompressor when increasing the degree of superheat of the refrigerant flowing out of the heat medium cooling evaporator.

3. The refrigeration cycle device of claim 2, wherein
the controller increases the decompression level of the decompressor by decreasing a passage sectional area of the decompressor.

4. The refrigeration cycle device of claim 1, wherein
the evaporator and the heat medium cooling evaporator are located downstream of the decompressor and are connected to each other in parallel with respect to a flow direction of the refrigerant,
the decompressor includes
a first decompressor that decompresses the refrigerant flowing from the radiator toward the evaporator and a second decompressor that decompresses the refrigerant flowing from the radiator toward the heat medium cooling evaporator, and the controller increases a ratio of a decompression level of the second decompressor to a decompression level of the first decompressor when increasing the degree of superheat of the refrigerant flowing out of the heat medium cooling evaporator.

5. The refrigeration cycle device of claim 4, wherein the controller increases the ratio of the decompression level of the second decompressor to the decompression level of the first decompressor by decreasing a passage sectional area of the second decompressor as compared to a passage sectional area of the first decompressor.

6. The refrigeration cycle device of claim 1, wherein the evaporator and the heat medium cooling evaporator are located downstream of the radiator and are connected to each other in parallel with respect to a flow direction of the refrigerant,
the decompressor includes
a first decompressor that decompresses the refrigerant flowing from the radiator toward the evaporator and
a second decompressor that decompresses the refrigerant flowing from the radiator toward the heat medium cooling evaporator, and
the controller periodically switches between an ordinary state and a superheat-degree increasing state when increasing the degree of superheat of the refrigerant flowing out of the heat medium cooling evaporator,
in the ordinary state, a ratio of a decompression level of the second decompressor to a decompression level of the first decompressor is a specified ratio, and
in the superheat-degree increasing state, the ratio of the decompression level of the second decompressor to the decompression level of the first decompressor is greater than that in the ordinary state.

7. The refrigeration cycle device of claim 1, wherein the radiator is
a cabin heater that condenses the refrigerant discharged from the compressor to heat a cabin of a vehicle or
a heating heat exchanger that outputs a heating heat medium by condensing the refrigerant discharged from the compressor to allow the refrigerant to exchange heat and that heats the cabin using the heating heat medium,
the evaporator is an exterior heat exchanger that evaporates the refrigerant by allowing the refrigerant decompressed in the decompressor to absorb heat from outside air, and
the cooling target device is a cabin cooler that cools the cabin by performing a heat exchange between air flowing toward the cabin and the cooling heat medium.

8. The refrigeration cycle device of claim 7, wherein the detector detects a temperature of the cabin cooler, and the controller determines that the cabin cooler is subcooled based on the temperature of the cabin cooler.

9. The refrigeration cycle device of claim 7, wherein the detector detects a temperature of the air discharged from the cabin cooler, and
the controller determines that the cabin cooler is subcooled based on the temperature of the air.

10. The refrigeration cycle device of claim 7, wherein the detector detects a temperature of the cooling heat medium, and
the controller determines that the cabin cooler is subcooled based on the temperature of the cooling heat medium.

11. The refrigeration cycle device of claim 7, wherein the detector detects a temperature or a pressure of the refrigerant flowing through the compressor, the radiator, the decompressor, the evaporator and the heat medium cooling evaporator, and
the controller determines that the cabin cooler is subcooled based on the temperature or the pressure of the refrigerant.

12. The refrigeration cycle device of claim 1, wherein the evaporator is a cooler for a vehicle that cools a cabin of the vehicle by evaporating the refrigerant decompressed in the decompressor,
the radiator is an exterior heat exchanger that generates condensation heat by condensing the refrigerant discharged from the compressor and radiates the condensation heat to an outside of the vehicle, and
the cooling target device is a battery that stores electric power for moving the vehicle.

13. The refrigeration cycle device of claim 12, wherein the detector detects a temperature of the battery, and the controller determines that the cabin cooler is subcooled based on the temperature of the battery.

14. A refrigeration cycle device comprising:
a compressor that compresses a refrigerant and discharges the refrigerant;
a radiator that allows the refrigerant discharged from the compressor to radiate heat;
a decompressor that decompresses the refrigerant flowing into the decompressor after radiating heat in the radiator;
a heat medium cooling evaporator that cools a cooling heat medium by performing a heat exchange between the refrigerant decompressed in the decompressor and the cooling heat medium, the cooling heat medium having a specific heat greater than a specific heat of air;
a cooling target device that is cooled by the cooling heat medium flowing into the cooling target device after exchanging heat with the refrigerant in the heat medium cooling evaporator;
a detector that is configured to detect a subcooling state of the cooling target device having a temperature lower than or equal to a reference temperature; and
a controller that increases a degree of superheat of the refrigerant flowing out of the heat medium cooling heat exchanger upon the detection of the subcooling state of the cooling target device by the detector as compared to a degree of superheat of the refrigerant flowing out of the heat medium cooling heat exchanger when the detector does not detect the subcooling state.

15. A refrigeration cycle device comprising:
a compressor that compresses a refrigerant and discharges the refrigerant;
a radiator that allows the refrigerant discharged from the compressor to radiate heat;
a decompressor that decompresses the refrigerant flowing into the decompressor after radiating heat in the radiator;
a heat medium cooling evaporator that cools a cooling heat medium by performing a heat exchange between the refrigerant decompressed in the decompressor and the cooling heat medium, the cooling heat medium having a specific heat greater than a specific heat of air;
a cooling target device that is cooled by the cooling heat medium flowing into the cooling target device after exchanging heat with the refrigerant in the heat medium cooling evaporator; and a controller that determines whether a temperature of the cooling target device has a chance of falling below a reference temperature based on a physical quantity detected by a detector, wherein the controller increases a degree of superheat of the refrigerant flowing out of the heat medium cooling evaporator upon the determination of the chance as compared to a degree of superheat of the refrigerant flowing out of the heat medium cooling evaporator when the controller determines the temperature of the cooling target device has no change of falling below the reference temperature.

\* \* \* \* \*